(12) United States Patent
Pollak et al.

(10) Patent No.: US 8,864,497 B1
(45) Date of Patent: Oct. 21, 2014

(54) GEOGRAPHICALLY DISTRIBUTED SIMULATION SYSTEM, COMPONENTS AND METHODS

(75) Inventors: Eytan Pollak, Oviedo, FL (US); Zhihua Qu, Orlando, FL (US)

(73) Assignee: L-3 Communications Corporation, New York, NY (US)

( * ) Notice: Subject to any disclaimer, the term of this patent is extended or adjusted under 35 U.S.C. 154(b) by 7 days.

(21) Appl. No.: 12/955,892

(22) Filed: Nov. 29, 2010

Related U.S. Application Data

(60) Provisional application No. 61/264,800, filed on Nov. 28, 2009.

(51) Int. Cl.
*G09B 9/08* (2006.01)

(52) U.S. Cl.
USPC .......................................................... 434/37

(58) Field of Classification Search
USPC .............................. 434/37, 29, 30, 38, 61, 62
See application file for complete search history.

(56) References Cited

U.S. PATENT DOCUMENTS

| 6,144,884 | A | 11/2000 | Niemeyer et al. | |
|---|---|---|---|---|
| 2009/0066858 | A1 | 3/2009 | Turner et al. | |
| 2009/0099824 | A1* | 4/2009 | Falash et al. | 703/8 |
| 2011/0027761 | A1* | 2/2011 | Nunez et al. | 434/37 |

FOREIGN PATENT DOCUMENTS

| WO | 2007062260 | 5/2007 |
|---|---|---|

OTHER PUBLICATIONS

Preusche, Carsten and Hirzinger, Gerd (2007): Haptics in Telerobotics. The Visual Computer, 23 (4), Springer Berlin / Heidelberg, pp. 273-284.

* cited by examiner

*Primary Examiner* — Robert J Utama
*Assistant Examiner* — Robert P Bullington
(74) *Attorney, Agent, or Firm* — Tiajoloff and Kelly LLP

(57) ABSTRACT

A distributed, networked simulation system has two or more vehicle simulators that resists latency errors when the vehicles are close to each other, and is especially useful for close maneuvering training such as tanker and receiver aircraft refueling exercises or combat exercises where one aircraft closely follows another. One simulator sends the other simulator data defining the relative linear displacements and rotations between their two vehicles. The receiving simulator uses the data to maintain the relative position of the other vehicle in its local scene data based on the defined relative displacement and rotation between the vehicles. An additional simulator may simulate the boom control on the tanker using similar relative position data. The system starts relative displacement data operation when one vehicle approaches another in the virtual world, and returns to normal operation when the vehicles separate.

31 Claims, 9 Drawing Sheets

GEOGRAPHICALLY DISTRIBUTED SIMULATION SYSTEM, COMPONENTS AND METHODS

RELATED APPLICATIONS

This application claims priority of U.S. provisional application Ser. No. 61/264,800 filed on Nov. 28, 2009, which is herein incorporated by reference.

FIELD OF THE INVENTION

The present invention relates to the field of systems that display an immersive environment scene to a user, and more particularly to a distributed system in which a number of computerized simulators are connected by a network so that the users of the simulators all view and access a shared virtual world.

BACKGROUND OF THE INVENTION

Contemporaneous training of multiple individuals separated by substantial geographical distances can be provided using a distributed system of simulators connected by a network, such as the Internet or a dedicated long-haul DMO network. In such a distributed system, each simulator is supported by a local computer system that has stored therein scene data that defines the position and appearance of all the objects in the virtual environment, and from that scene data, the simulator computer system renders and displays a view of the virtual environment as it is influenced by the various individuals in the simulators.

The delays in the communications over the network produce some latency between remotely spaced simulator systems, in that data transmitted as electrical signals over the network that controls the position of objects in the virtual world arrives at different simulators at slightly different times. This latency can result in the versions of the scene data stored in memory at each simulator being divergent, sometimes with radically different effects in terms of the consequences of movement, e.g., where a plane passes a building safely in one version of the virtual world, and in another version the same plane crashes into the building. Where latency is, for example, 220 milliseconds, the time period corresponds to 90 feet of error at 250 knots. It can be understood easily that an error of 90 feet may be significant. The lateral and vertical movement is also delayed.

To try to overcome some problems of latency, systems have been developed in which each simulation station computer has a physics engine that provides for more realistic interaction of objects in the immersive environment according to physics rules. One such system is the system disclosed in International Patent application PCT/US2006/045569 filed Nov. 28, 2006 entitled DISTRIBUTED PHYSICS BASED TRAINING SYSTEM AND METHODS and published on May 31, 2007 as application no. WO/2007/062260, and also published on Apr. 16, 2009 as U.S. published application US2009/0099824 A1, both herein incorporated by reference. In that system, signals corresponding to physics data is sent over the network and received at remote simulators, where the data is used to control movement of the relevant objects in a local physics engine at the local simulator computer system. The physics based movements of objects are reflected in the scene data stored electronically at the local simulator system and displayed to the user.

Notwithstanding the advantages of a physics-based environment generating system for supporting a shared virtual environment over a distributed system of simulators, there are still some scenarios where latency presents a problem of divergence of versions in two simulator stations. One such situation is encountered where two virtual aircraft are each controlled by a human trainee, and at least one of the trainees is trying to establish a spatial relationship with the other aircraft, such as in a dogfight when trying to establish a line of fire on an enemy aircraft, a tactic requiring formation flight in close proximity to a companion aircraft, or in an in-flight refueling operation where a receiver aircraft has to fly in close formation with a tanker from which it derives fuel.

In such scenarios, one pilot may move in one direction while the other pilot moves in a different direction, and latency between the two sources of input may result in a compound of error that produces a jittery interaction in one or both simulators that is unrealistic in appearance and undesirable from a training standpoint.

Compensation using traditional prediction techniques results in overshoot and oscillation of the remote vehicle position from its true position. Dead reckoning in accordance with the DIS protocol can result in sudden jumping to the remote aircraft position, requiring additional filtering and adding to the error, or in the case of tight dead reckoning tolerance settings a flood of high rate packets on the network consuming unacceptable bandwidth.

Position and velocity oscillations that occur between the tanker, receiver and boom operator when the trainers are located at remote sites, even with traditional smoothing and prediction techniques, make it objectionable to pilots performing the refueling tasks, thereby rendering training ineffective. Refueling must therefore be performed using operational aircraft, resulting in additional cost and risk.

Similar problems of velocity or position oscillations occur in other close-range maneuvering operations that make the training and simulation less effective.

SUMMARY OF THE INVENTION

It is therefore an object of the present invention to provide a distributed simulation system, components of such a system, and a method of operating such a system that improves on the systems of the prior art and reduces the effect of latency where two human-controlled entities or vehicles, especially aircraft, are close to each other in the simulated world.

According to one aspect of the invention, a system provides a shared simulation environment, and comprises first and second simulators each associated with a respective user and linked over a network so as to communicate with each other. The simulators each include a data storage system storing a respective version of time-varying scene data thereon including data defining positions of virtual objects in the simulation environment, a computerized image generator accessing the scene data and generating therefrom video in real-time as a stream of images each rendered based on the scene data, and a display that receives and displays the video from the image generator. The first and second simulators simulate, respectively, first and second vehicles in the respective versions of the simulation environment so as to be controlled by the respective users. The first simulator determines a position of the first vehicle in the simulation environment and modifies the scene data of the first simulator such that the video displayed at the display device thereof reflects the position of the first vehicle. The first simulator transmits first position data defining the position of the first vehicle over the network. The second simulator receives the first position data and modifies the scene data of the second simulator so as to move the first vehicle to or toward the position defined therefor in the version of the scene data stored at the second simulator. The second simulator determines a position of the second vehicle and modifies the scene data of the second simulator such that the video displayed at the display device thereof reflects the position of the second vehicle. The second simulator transmits over the network second position data that defines, or from which can be derived, a relative displacement of the second vehicle with respect to the first vehicle in the second simulator version of the scene data. The first simulator receives the second position data and modifies the version of the scene data of the first simulator so as to move the second vehicle to or toward a position relative to the first vehicle in the simulation environment corresponding to the relative displacement of the second position data received.

According to another aspect of the invention, a method for providing an interactive simulation to a plurality of users comprises providing to each of the users a respective simulator station simulating a respective vehicle controlled by the user. Each of said simulation stations has a display displaying to the associated user video rendered by a computerized image generator thereof from scene data stored in a respective computer accessible data storage system. At a first of the simulator stations, a position of the vehicle simulated thereby in an environment of the interactive simulation is determined, and the scene data at the simulation station is modified so as to correspond to the position. Position data defining the position of the vehicle from the first simulation station is transmitted over a network, and is receiving over the network at a second of the simulation stations. The scene data at the second simulation station is modified so as to move the vehicle simulated by the first simulation station to or toward the position in the scene data of the second simulation station. At the second simulator station, a position of the vehicle simulated thereby in an environment of the interactive simulation is determined, and the scene data at the simulation station is modified so as to correspond to that position. Second position data that defines, or from which can be derived, a relative displacement of the vehicle simulated by the second simulation station with respect to the vehicle simulated by the first simulation station as defined by the scene data of the second simulation station is transmitted over the network. The second position data is received at the first simulation station, and the scene data of the first simulation station is modified such that the scene data thereof indicates that the vehicle of the second simulation station has moved into or toward a position relative to the position of the vehicle of the first simulation station that corresponds to the relative displacement defined by the second position data.

It is also an object of the invention to provide a distributed simulation system for simulating in-flight refueling of aircraft where a receiver aircraft is simulated in a first simulation station, and the tanker aircraft is simulated in a second simulation station remotely located from the receiver aircraft simulation station.

According to an aspect of the invention, these objects are accomplished by a system comprising first and second computerized simulation stations connected and communicating with each other via electrical signals sent over a distributed network. Each simulation system includes a computer system with computer accessible memory or data storage storing scene data defining a respective version of the virtual environment of the training experience, and an image generator generating a display for the respective user from the scene data. Preferably, this scene data is linked to physics data stored in a physics engine of the simulation system, which physics data positions the objects in the scene data based on physics based representations of those objects.

In one embodiment of the invention, the first simulation station provides a first user with a simulation of a tanker aircraft, and the second simulation station provides a second user with a simulation of a receiver aircraft.

The tanker simulation system includes a master tanker simulation component that, based on input from the first user in a simulated cockpit, determines a position and orientation of a master tanker in the virtual world and transmits data to the second simulation system reflecting the position and orientation of the tanker, and preferably also physics data corresponding to physical forces being applied to or in the tanker.

The second simulation system includes a slave tanker simulation that receives the data reflecting the inputs and outputs position and orientation of the master tanker and causes a slave tanker in the virtual world of the data of the second simulator to move toward the position of the master tanker with a control loop.

The second simulation system also includes a master receiver simulation that, based on input from the second user in a simulated cockpit of the second simulation system, determines a position and orientation of a master receiver aircraft in the virtual world. The master receiver simulation then sends data to the first simulation system over the network, this data reflecting the relative position of the master receiver relative to the slave tanker in the second simulation system, and also preferably relative velocity and rates of rotation about three axes of the master receiver relative to the slave tanker, and also physics data corresponding to forces on the receiver aircraft.

The first simulation system also comprises a slave receiver simulation and synchronizer that receives the data from the master receiver simulation and causes a slave receiver aircraft at the first simulation system to move into a position relative to the master tanker in the virtual environment corresponding to the relative position of the receiver to the tanker transmitted by the master receiver simulation.

A third simulation system simulates the boom operator station. This simulation system is most likely located near the tanker simulation system, such that there is negligible or no latency between them. The boom system therefore has a slave tanker synchronizer that places the tanker in the position indicated by the scene data of the tanker simulation with no latency error. The boom operator simulation station also has a slave receiver synchronizer that receives the data defining the relative position between the receiver aircraft and the tanker, and the synchronizer generates physics that move the receiver aircraft in the boom operator simulator to a position defined by that relative position.

Where the boom operator simulator is remote from the tanker simulator, and latency exists, the boom operator simulator has a master boom simulation that transmits the position of the boom relative to the receiver to a slave boom synchronizer at the tanker and receiver simulators. The receiver master simulation transmits the relative position of the receiver to the boom, and the tanker simulator has boom and receiver synchronizers that apply forces that move the boom into an appropriate relative position to the tanker and the receiver into an appropriate relative position to the boom.

The above-described system of two simulators each with a master simulation for its hosted ownship and a slave synchronizer for a nearby aircraft can be used in other environments where minimizing latency effects is important for maintaining appropriate relative spacing and orientation between two nearby aircraft. In such a situation, one of the aircraft simulators will transmit from its own master simulation its relative position (and preferably also its relative velocities in three dimension and relative rotational rates around three axes relative to the slave aircraft) to the other aircraft, and the other aircraft simulator will use that relative position data to control the position of the first aircraft in the second aircraft simulated environment relative to itself.

In addition, simulations other than flight simulation may make use of the invention here to mitigate latency effects between two or more entities in these simulations that are close to each other in the virtual world but geographically remote from each other in reality.

The invention provides for a stable interaction of vehicles in a simulation environment, even where latency is variable and produces substantial delays in transmission of data.

Other objects and advantages of the invention will become apparent from the specification.

DETAILED DESCRIPTION

Distributed simulations have been used for many years to train people to use various types of vehicles, especially aircraft, in a variety of exercises. An advantage of training first in a simulation is that the pilot skills for difficult maneuvers or operations is developed at least to a degree before the more dangerous real-world operation is undertaken. Additional advantages include ability to train where otherwise restricted by airspace constraints, and ability to achieve required skill levels at significantly reduced cost. Various combat and non-combat mission skills are taught using groups of simulators connected in local or wide area networks.

Figure 1:
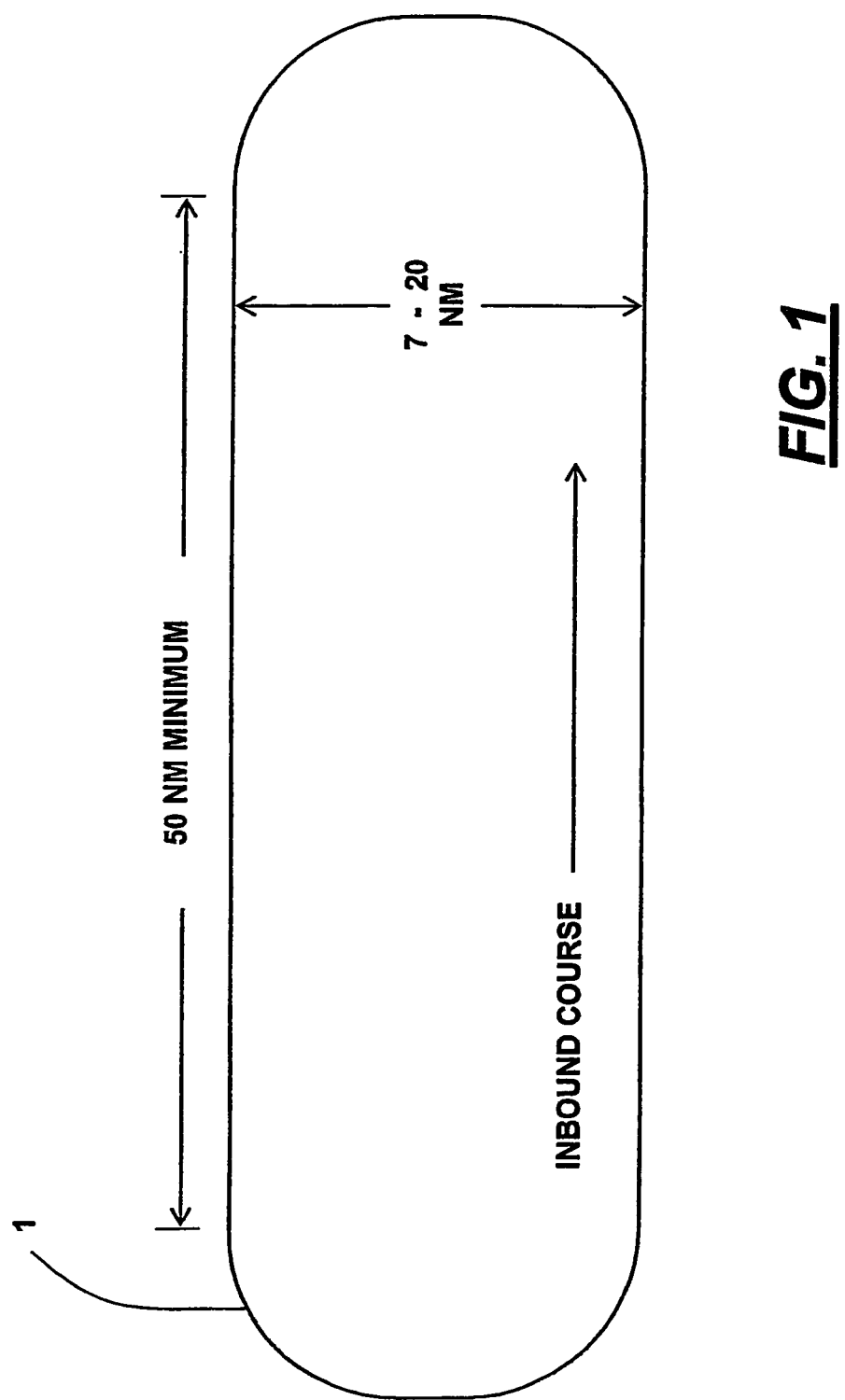
FIG. 1 is a schematic diagram of the flight pattern of a tanker in an in-flight refueling operation.

One such operation of relatively high complexity is flight aerial refueling of an aircraft, such as a helicopter or fighter jet (the receiver aircraft) from an aircraft outfitted to carry fuel and deliver it through a boom (a tanker). In aerial refueling, the tanker pilot flies an Air to Air Refueling (AAR) orbit and performs rendezvous techniques. A typical AAR track 1 is shown in FIG. 1. Aerial refueling is conducted with the tanker and receiver operating in an oval AAR track 1 which is at least 50 nautical miles in length and 7 to 20 nautical miles across. The receiver pilot must fly and maintain contact position for refueling throughout the entire track during refueling. In addition to the pilot of the tanker, the tanker aircraft has a boom operator who faces out the rear of the tanker. The boom operator positions the boom nozzle into the receiver receptacle, initiates fuel transfer, monitors receiver's rate of movement and advises the receiver pilot in maintaining the AAR envelope.

In aerial refueling, the receiver aircraft begins flying in a position directly below and approximately 50 feet behind the boom nozzle. When cleared, the receiver aircraft moves forward aided with either radio commands or visible lights on bottom of the tanker. Once the receiver reaches the position in which the nozzle can be safely mated with the receiver receptacle, the pilot attempts to hold that position. The boom remains fixed in the pre-contact position until the receiver attains the contact position. The boom operator then precisely positions the boom nozzle into the receiver's receptacle. The receiver pilot must maintain position within the boom operating envelope. During the refueling mission, the receiver pilot and boom operator maintain radio contact. The boom operator provides a break command to end the refueling.

Figure 2:
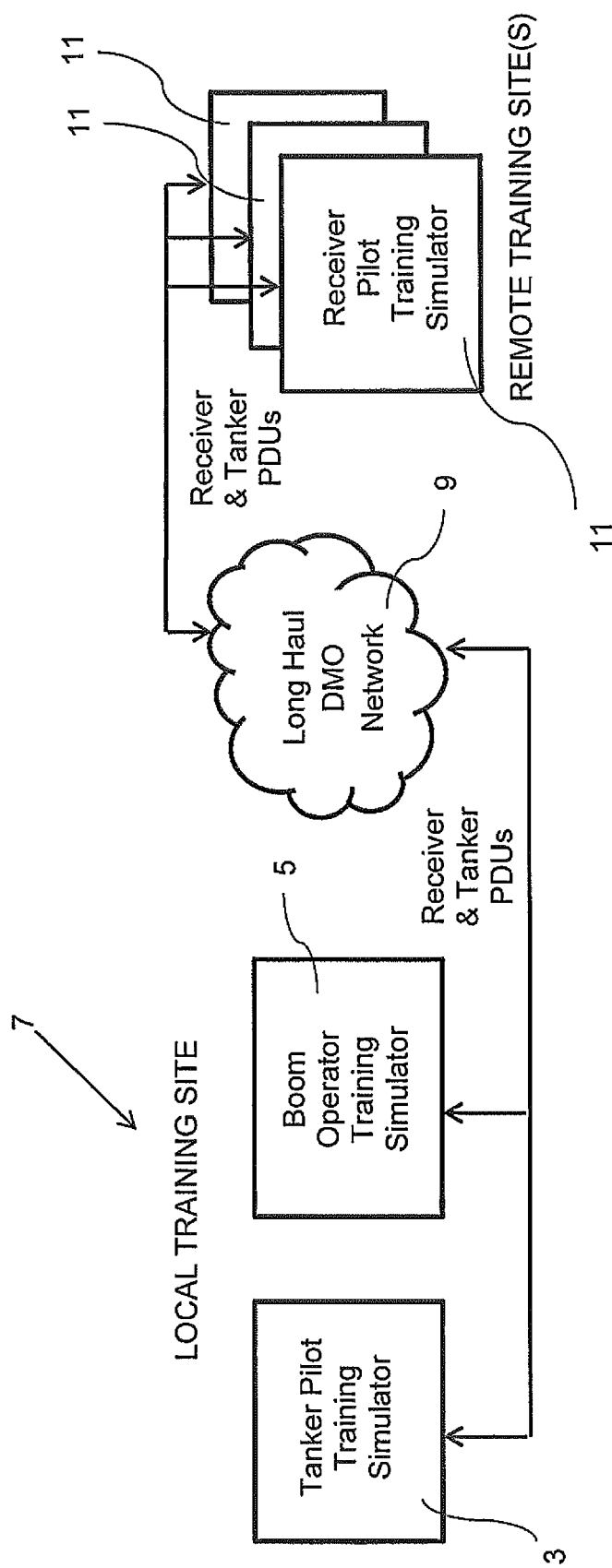
FIG. 2 is a schematic diagram showing a distributed simulation system for training pilots and boom operators to perform in-flight aerial refueling operations.

FIG. 2 illustrates a distributed training system for training a tanker pilot, a boom operator and one or more receiver pilots. The system has a tanker pilot training simulator 3 and a boom operator training simulator 5 preferably located in a local training site generally indicated at 7. Because of their physical proximity, there is little or no latency between the tanker and boom simulators 3 and 5.

The simulators 3 and 5 communicate over a network 9 with one or more receiver aircraft training simulators 11 that are usually located at some distance from the local training site 7, and may be each located at a respective remote training site geographically far from each other. The distance from the local training site 7 to the remote training site or sites results in a delay in communications over the network 9, which may be substantial, often 200 milliseconds or more, and variable. The network 9 may be the Internet or may also be a dedicated long-haul DMO network, or some other distributed wide-area network dedicated to this type of communications.

The tanker simulator 3 and the receiver aircraft simulator(s) 11 are each a flight simulator generally as is well known in the art and that preferably operates according to a physics-based environmental generator system described in U.S. published patent application US2009/0099824 A1. Suitable for use as the simulators are systems such as described in U.S. published patent application US2009/0066858 of James A. Turner et al. published on Mar. 12, 2009 and entitled DISPLAY SYSTEM FOR HIGH-DEFINITION PROJECTORS, which is herein incorporated by reference.

The simulators 3 and 11 each has a simulated cockpit that mimics the cockpit of a real tanker or other aircraft, and processes pilot actions on the controls as input to a computer system that supports the simulator functions. The cockpit controls can be any input device(s) suitable for the given vehicle or aircraft, and may be as complex as those of a real aircraft, or the simulator may be controlled by a simpler input device, such as e.g., a joystick. The cockpit also is an output device such that dials and indicators are controlled by output from the simulator computer system.

Each simulator 3 or 11 includes a computer system, which is a single or multiprocessor architecture computer system that operates using software instructions stored therein that cause the simulator to interact with the pilot so as to simulate operation of the real aircraft in a defined simulated environment or virtual world. The simulator virtual world is defined by data stored in one or more computer accessible data storage devices or memory devices at the site of the simulator. In the preferred embodiment, all objects in the simulated world are defined by physics data that is accessed by a physics engine that regulates the movement and locations of objects in the virtual world according to physics rules, except potentially the ownship of the simulator itself, which may be controlled by a computerized system running software configured to provide precise simulation of that vehicle. Each object defined in the physics database is also reflected in a database of scene data stored at the site. The scene data defines for each object its appearance and, together with the location data for the objects as determined by the physics engine, is accessed by one or more image generators of the simulator computer system to render images in real time of the virtual world in which the aircraft is being simulated. These images are displayed on one or more display screens or on a helmet mounted display to the pilot and provide out-the-window views that make the simulation more realistic.

Figure 8:
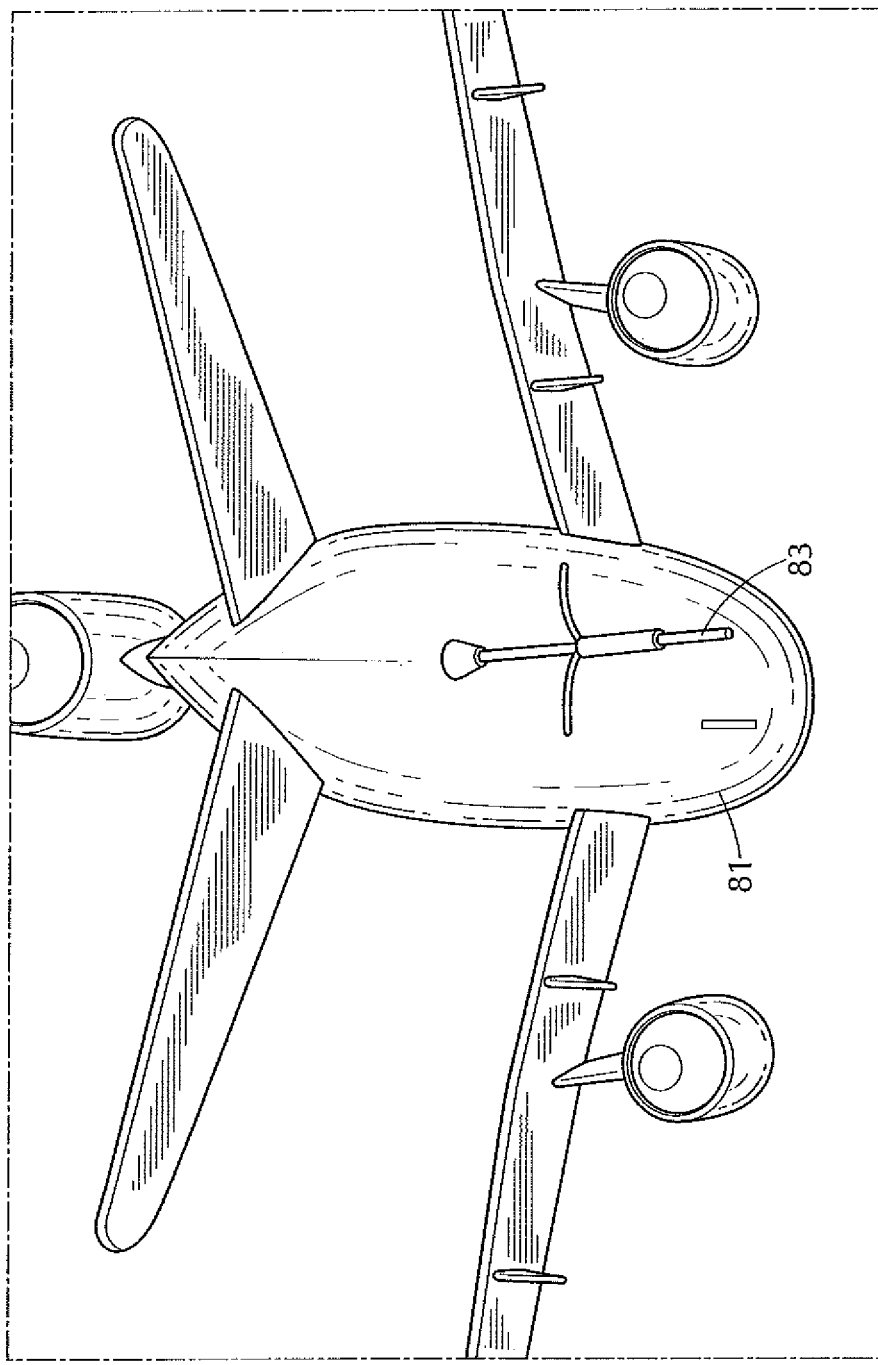
FIG. 8 is an exemplary out-the-window view or portion of such a view in a simulator representing a receiver aircraft in a refueling exercise.

FIG. 8 shows an example of the out-the-window view (or a portion of such a view where there is a larger field of view display) from a receiver aircraft simulator in a refueling exercise. The tanker aircraft 81 is visible as is the boom 83 trailing behind it, to which the receiver connects to refuel. Because it is flying in generally the same location and direction, the tanker simulator has a similar view of the sky or the landscape, except that the tanker view does not include the tanker 81 itself.

Figure 9:
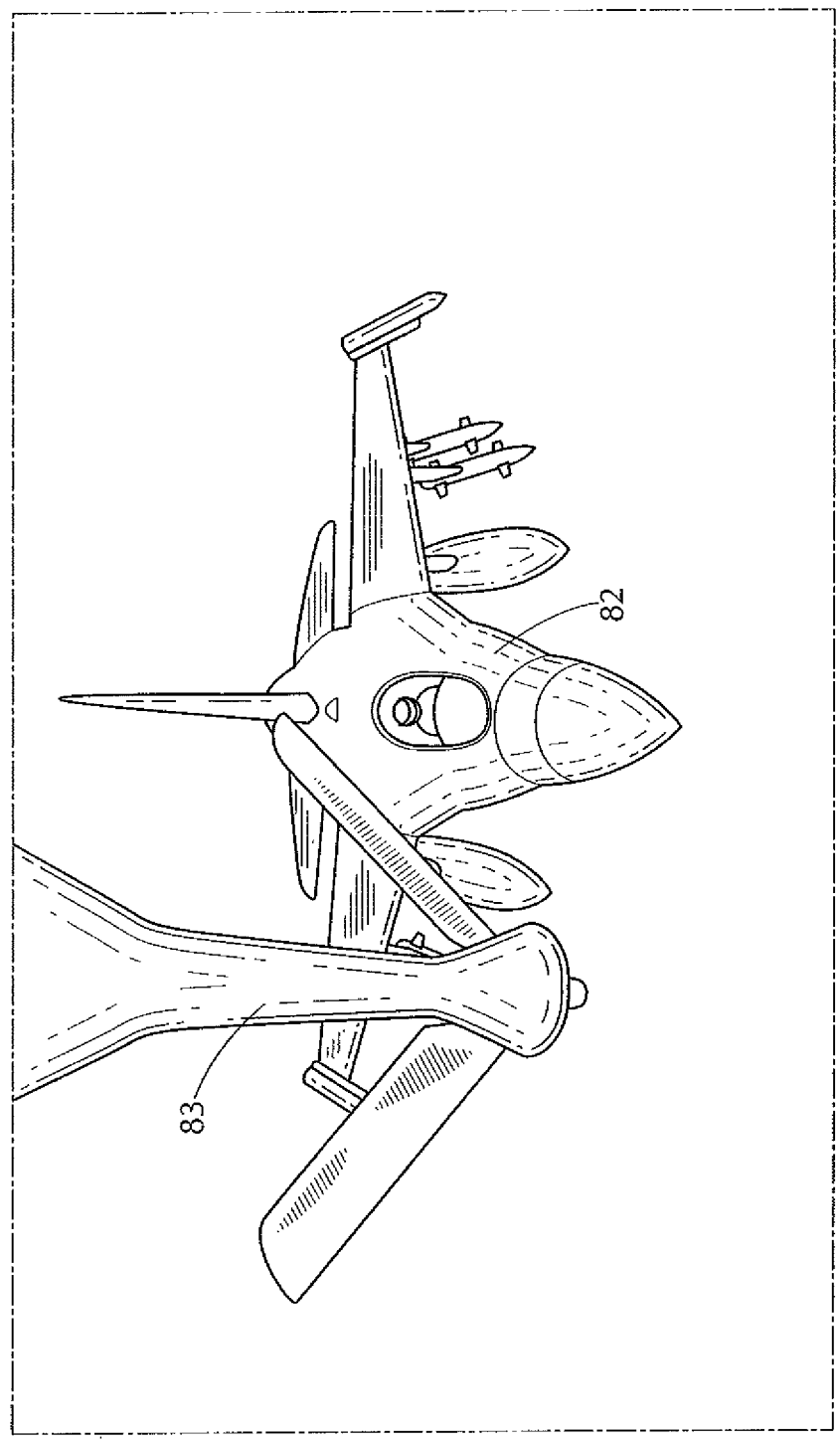
FIG. 9 is an exemplary out-the-window view or portion of such a view in a simulator representing the boom operation station of the tanker in a refueling exercise.

FIG. 9 shows an exemplary view of an out-the-window scene displayed to the simulator occupied by the boom operation trainee. The boom operator simulator displays a rendered rearward view from the tanker, which contains the receiver aircraft 82 and also the boom 83 itself.

For purposes of this application, it should be understood that that all actions or method steps described herein, except for actions of the trainees in the simulated cockpits, are performed by a computer or computers operating according to software comprising computer instructions stored so as to be accessible to the relevant computer, or are performed by dedicated electronic hardware. Moreover, the term data as used herein refers to electrical signals that carry information, or to stored data in a device or memory that is electronically accessible to a computer or electronic circuit.

Figure 3:
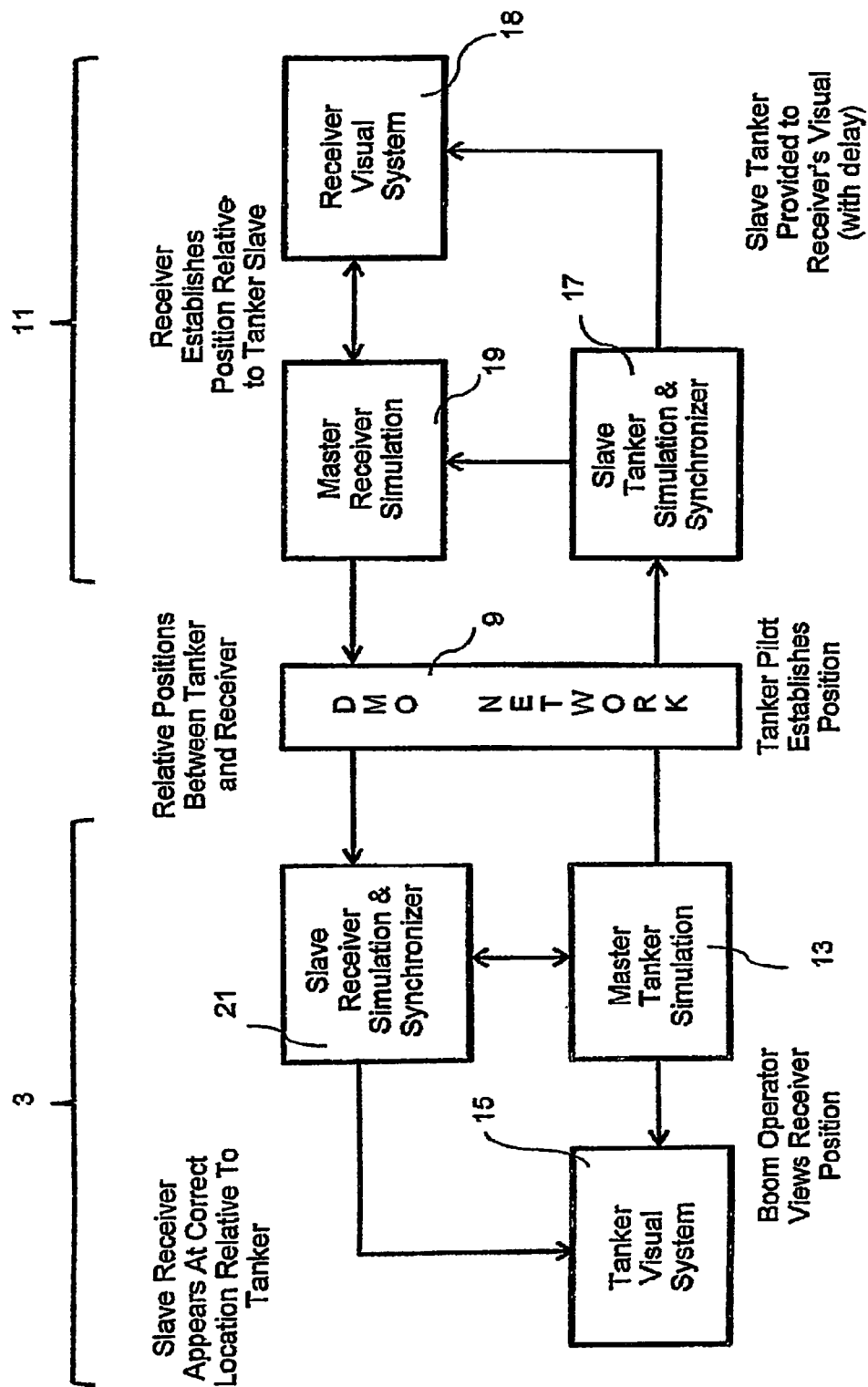
FIG. 3 is a schematic diagram showing control operation of the tanker aircraft simulator and the receiver aircraft simulator communicating over a network.

As previously discussed, the transmission of data over a geographically distributed network takes time that can result in a delayed signal, i.e., in latency at the receiving system. To aid in overcoming the effects of latency between the tanker simulator 3 and the receiver simulator 11, a master/slave synchronizer approach is used that is similar in some respects to the synchronizers described in U.S. published application PCT/US2006/045569. A master synchronizer or host vehicle managing component is associated with the man-in-loop simulator of the relevant aircraft, and represents the authoritative source of the data about that aircraft. The slave synchronizers or slave vehicle managing component for that aircraft are located across the network remote from the man-in-loop simulator. The data transfer and internal architecture of the simulator master/slave components is illustrated in FIG. 3. The term "synchronizer" as used herein means a component that causes a slave vehicle representation to move to or toward a position determined by the host simulator that simulates that vehicle. The host simulator component that sends out the authoritative definition of the position of the vehicle is the "master synchronizer" and the slave vehicle managing component at another remote simulator is the "slave synchronizer" that takes action to move the slave vehicle in the scene data of the remote simulator to the position in the virtual environment that the "master synchronizer" directs. The "synchronizers" do not necessarily use time stamps or other time-based data to position their vehicles, but generally act to move the associated vehicle to the position identified by the most recent position data received, resulting in a general "synchronization" in the sense that the slave vehicles across the network collectively tend toward the location of the master vehicle, but not according to any specific timing data. The various components may be implemented using software running on the local simulator computer system, or using more dedicated hardware systems.

Referring to FIG. 3, the tanker simulator 3 has a master tanker simulation component 13 that determines the position, orientation and activity of the tanker ownship. The master tanker simulation component 13 includes software simulating the avionics and other operative characteristics of the tanker in reaction to the man-in-the-loop tanker pilot operation of the simulator cockpit and other influences from other objects and conditions in the virtual environment, e.g., wind, weather, other objects, etc. Based on these, and in interaction with the local physics engine, the master tanker simulation component 13 determines the authoritative position and orientation of the tanker, expressed in six degrees of freedom, i.e., the coordinates in the virtual world of the location of the center of gravity of the aircraft, and rotational displacement of the axes of the tanker ownship relative to the virtual world coordinate axes, preferably a round earth coordinate system of latitude, longitude and altitude. The simulation component 13 also determines the velocity of the tanker ownship in the coordinate axes, as well as its rate of rotation about each of those axes.

The data defining the position and orientation of the tanker is then passed to the tanker visual system component 15, modifying the local version of the scene data that includes the virtual objects that make up the tanker in the virtual environment. The tanker visual system continually (at a duty cycle of 60 Hz) generates the real-time out-the-window imagery in the local image generator(s). This imagery is continually displayed in real time to the tanker pilot on the displays of the simulator.

In addition, the master tanker simulation component 13 transmits the inputs and outputs position and orientation and rate data over the network 9 using DIS protocols to a slave tanker simulation and synchronizer component 17 operating on the relevant receiver aircraft simulator computer system 11. Due to the delay in transmission over the network 9, the data when it arrives is out-of-date by the latency time of the network to the simulation station 11. The slave tanker simulation and synchronizer component 17 uses this data to control movement of the slave tanker object in its local version of the physics data for the virtual world, and calculates data values defining forces for use in the local physics engine that are configured to move the slave tanker in the receiver virtual world toward or into the position and orientation of the master tanker, and also moving and rotating at the same rates, as determined by master tanker simulation 13, as will be discussed below.

The slave synchronizer 17 causes the slave tanker in the receiver simulator scene data to move toward or into a certain desired position and orientation and rates of movement and rotation that is essentially in the past, by the time the data reaches station 11 over the network 9. The receiver visual system 18 receives the position and orientation data from the slave tanker synchronizer 17 and incorporates it into the local scene data, which is in turn used to generate the out-the-window imagery shown in real time to the receiver aircraft pilot in simulation.

Receiver simulation station 11 also has a master receiver station 19 that runs simulation software that simulates the operation of the receiver aircraft based on the man-in-loop input from the receiver pilot and the other physics-based influences on the receiver aircraft in the simulation environment and determines the authoritative position and rates of movement and rotation of the receiver aircraft for the entire distributed system. The receiver pilot looks at his out-the-window view of the tanker, displayed in the position that results from the latency-delayed tanker position sent by the master tanker simulation 13 at the tanker simulator 3, and the receiver pilot interacts with his simulator cockpit as a man-in-loop to maintain his receiver aircraft in the correct position relative to the tanker. The master receiver simulation 19, responsive to the pilot's control actions in the cockpit, determines the authoritative position, orientation, and rates of movement and rotation in the six degrees of freedom, of the receiver aircraft in the version of the virtual world defined by the scene data of the receiver simulator 11.

The master receiver simulation transmits data back to the tanker simulator station 3 over the DMO network 9. This data defines the relative position of the receiver relative to the tanker. Preferably, this data represents the linear and rotational displacements of the receiver aircraft from the tanker aircraft, but can also be the actual position and orientation data of both the receiver and the tanker in the scene data of the receiver simulator 11, or some other data from which the spatial displacement and rotational displacement of the receiver aircraft from the tanker in the receiver simulator scene data can be derived. In addition, the data sent includes data corresponding to the relative velocities in the three world-coordinate dimensions and the relative rotational rates around the three world-coordinate axes of the master receiver relative to the slave tanker are transmitted to the tanker simulator.

At the tanker simulator, a slave receiver simulation and synchronizer 21 receives the data signals defining the relative position of receiver to tanker and uses this data to derive values and directions of virtual forces to be applied in the physics engine of the slave receiver to move the receiver toward or into a position that is the same relative to the tanker in the tanker simulator world as the relative position of the receiver to the tanker in the receiver simulator world. Due to the latency of transmission of the tanker position to the receiver simulator 11, the absolute position of the tanker may differ during the dynamic transition in the two worlds, but the relative position, which is more important in close maneuvers, is delayed only by the latency of communication from the receiver station 11 to the tanker station 3, and the synchronizer will ensure that the system will converge to the correct position.

The slave receiver synchronizer transmits data defining the adjusted position of the receiver in the tanker simulator world to the tanker visual system 15, and the tanker pilot then sees the receiver aircraft in his out-the-window imagery in a nearly current relative position.

The boom operator simulator station 5 is similar to an aircraft simulator, although the controls of the boom differ from those in a cockpit, and may be as complex as in a real boom control, or may be approximated by a joystick. The boom operator sees an out-the-window view of real-time rendered imagery that is produced by the image generators of the boom operator simulator 5, such as seen in FIG. 9. The scene data at the boom simulator is preferably shared with the tanker simulation station 3, and the boom operator sees the receiver in the out-the-window video in the same nearly-current relative position to the tanker as does the pilot of the tanker.

The boom operator therefore sees the nearly-current relative position between the tanker and receiver, as defined by the data received over the network 9 from receiver simulator 11, and is able to perform refueling procedures. The relative movement of the boom to the tanker, and boom to the receiver is driven by the boom operator at the tanker simulation station site 7. As the boom operator maneuvers the boom nozzle to the receiver, the relative position between the boom and receiver is set by the boom operator, although it is limited by boom physics. The boom is constrained in movement, but moves in three dimensions and also can be extended or retracted from the tanker aircraft body. Physics data reflecting the movement of the boom and its position and orientation are transmitted over the network 9 and implemented in the physics engine of the receiver simulator 11. In close operation, however, the relative position of the boom relative to the receiver aircraft in the simulated environment is transmitted to the receiver simulator over network 9. The receiver simulator has a slave boom synchronizer that determines forces to be applied to the boom in the local physics engine of the receiver simulator so as to move the boom toward or into the defined relative position with respect to the body of the receiver aircraft, and with the defined degree of extension. The physics of the boom drive the position of the slave boom at the receiver simulation 11 at the remote site based on the determined forces. Again, the actual positions of the boom, tanker and receiver may vary between the different versions of physics data and the scene data in the different simulators of the system, but the relative position of the boom to the receiver, which is critical to the exercise, is kept as up to date as possible.

In contrast to a system that tries to overcome latency by predicting a current position by extrapolating from latency-delayed rate and position data, predictions are not used in the closed loop control system of the present invention, nor is precise time synchronization across the sites required using this technique. In the close range operations addressed by the present invention, prediction or extrapolation of positions is undesirable, because they would tend to magnify the smaller relative movements between the aircraft, and may cause collisions.

Figure 4:
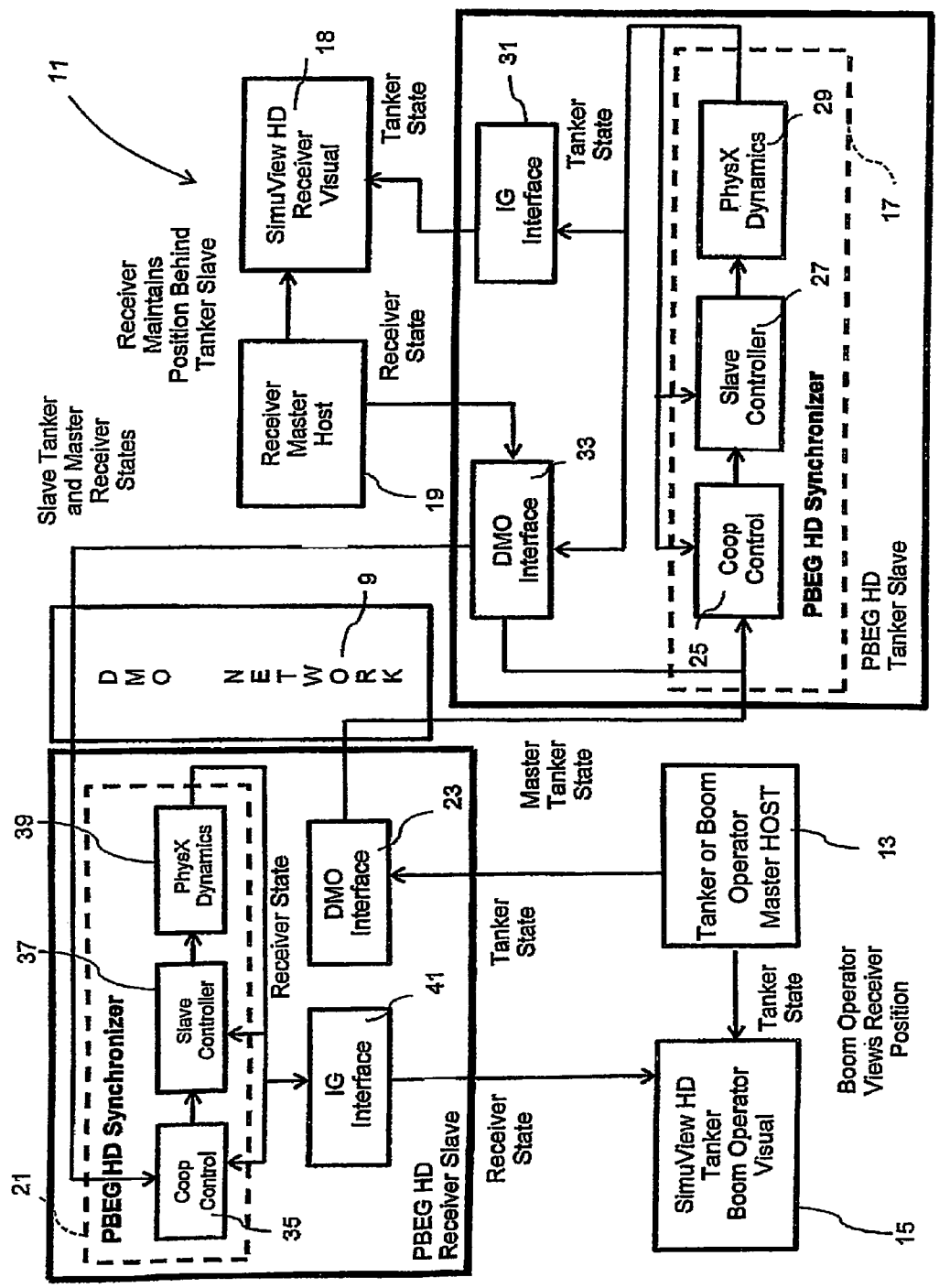
FIG. 4 is a more detailed schematic diagram of the control operation of a tanker aircraft or a boom operator simulator with a receiver aircraft simulator.

Referring to FIG. 4, a more detailed illustration of the system is seen. The Master Tanker simulator may consist of several computerized subsystems or may be contained within a single PC. In one embodiment, the master tanker consists of a single node PC running X-Plane that provides the entire Tanker Master simulation. The Master Tanker Flight simulator 13 provides man-in-the-loop control for the tanker pilot and boom operator. The Master Tanker Flight simulator provides an aerodynamic flight model that determines proper tanker aircraft state in response to flight control inputs from the tanker pilot. A boom model provides movement of the boom according to the boom operator controls. Cockpit flight instruments and displays are provided for the pilot, and boom controls are provided for the boom operator. The Master Tanker provides tanker aircraft and boom state to the PBEG HD systems in units and reference frames as set out below in Table 1.

TABLE 1

COOPERATIVE CONTROL FOR SLAVE TANKER SYNCHRONIZER INPUTS

| Parameter Description | Units | Reference Frame |
|---|---|---|
| (Master) Tanker State-Latitude | Degrees | Round Earth |
| (Master) Tanker State-Longitude | Degrees | Round Earth |
| (Master) Tanker State-Altitude above Mean Sea Level (MSL) | Meters | Round Earth |
| (Master) Tanker State-Velocity relative to East | Meters/Second | Round Earth |

TABLE 1-continued

COOPERATIVE CONTROL FOR SLAVE TANKER SYNCHRONIZER INPUTS

| Parameter Description | Units | Reference Frame |
|---|---|---|
| (Master) Tanker State-Velocity relative to North | Meters/Second | Round Earth |
| (Master) Tanker State-Vertical Velocity | Meters/Second | Round Earth |
| (Master) Tanker State-Aircraft Roll Angle | Degrees | Round Earth |
| (Master) Tanker State-Aircraft Elevation Angle (Pitch) | Degrees | Round Earth |
| (Master) Tanker State-Aircraft Yaw Angle (Heading) | Degrees | Round Earth |
| (Master) Tanker State-Aircraft Roll Rate | Degrees/Second | Round Earth |
| (Master) Tanker State-Aircraft Pitch Rate | Degrees/Second | Round Earth |
| (Master) Tanker State-Aircraft Heading Rate | Degrees/Second | Round Earth |
| Relative Boom Offset-Forward/Aft | Meters | Receiver Body |
| Relative Boom Offset-Lateral | Meters | Receiver Body |
| Relative Boom Offset-Vertical | Meters | Receiver Body |
| Relative Boom Velocity-Forward/Aft | Meters/Second | Receiver Body |
| Relative Boom Velocity-Lateral | Meters/Second | Receiver Body |
| Relative Boom Velocity-Vertical | Meters/Second | Receiver Body |
| Boom Extension Value | Meters | Boom |

The tanker or boom operator master host or simulation component 13 transmits master tanker state data (i.e., orientation and location data) to the local tanker or boom operator visual system 15, where the visual objects in the scene data that make up the tanker are moved to the defined location and orientation and displayed to the boom operator or tanker pilot on the respective simulator display.

The tanker simulation component also passes the master tanker and boom state data of Table 1 to a DMO interface 23 that places the data in an appropriate format and sends it over the network 9 to the PBEG HD tanker slave synchronizer 17 at the receiver simulator 11. The DMO interface 23 creates and transmits master tanker state physics data units (PDUs) in DIS format to the remote (Tanker Slave) PBEG. The DMO Interface also receives and unpacks the DIS PDUs sent from the remote PBEG. DIS packets conform to a given version of the DIS standard.

The PBEG HD Tanker Slave 17 computes the state of the remote tanker aircraft using realistic physical dynamics in response to the local and remote tanker state data. All functional components operate synchronized at a minimum 60 Hz update rate.

Figure 5:
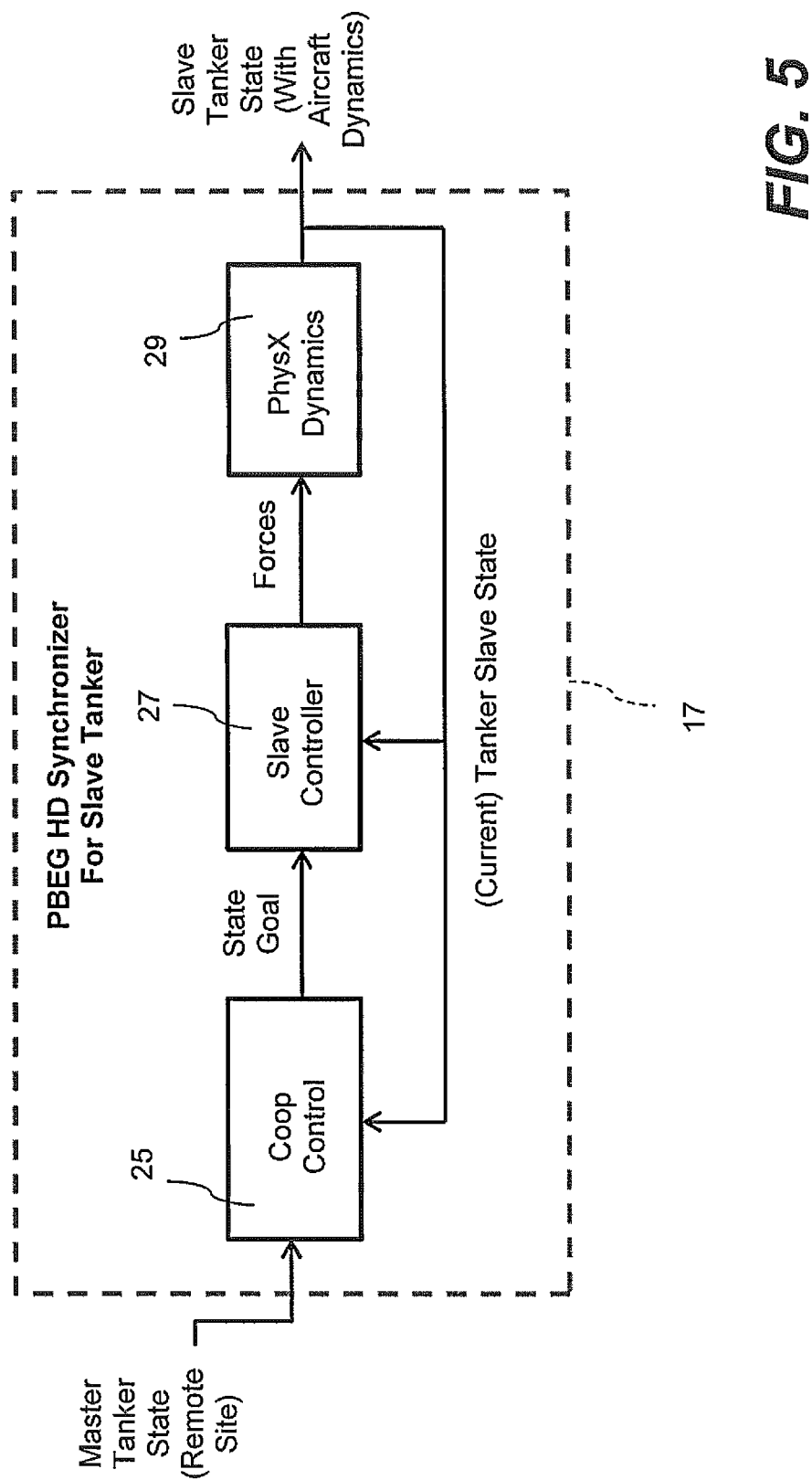
FIG. 5 is a schematic diagram of the operation of a slave synchronizer for the tanker in a simulator remote from the tanker simulator.

As best seen in FIG. 5, the PBEG HD Tanker Slave 17 includes a cooperative control 25 that receives the master tanker state data from the remote tanker simulator 13. Cooperative control 25 uses master tanker (remote) and current slave tanker (local) states (positions, orientations, velocities and rotational rates) to compute a new slave tanker state goal. Cooperative control 25 includes a PD controller that stabilizes the incoming signal or data stream from the tanker simulator 13, and has operator-adjustable parameters to tune the relative strengths of the master tanker and current slave tanker states in determination of the output state goal. The state goal is passed to the slave controller 27 in the local PBEG reference frame. The state goal is in a format as set out in Table 2 below.

The local PBEG means a local coordinate system of the physics data stored in the simulator for access by the local physics engine, and may be a reference frame of the tanker in the local simulator data. The reference frame of the aircraft body is based on three orthogonal coordinate axes of the receiver aircraft body. The x axis is the longitudinal centerline of the aircraft, the y axis is the lateral left-right direction of the aircraft, and the z axis is the vertical axis of the aircraft body.

TABLE 2

COOPERATIVE CONTROL FOR SLAVE TANKER SYNCHRONIZER OUTPUTS

| Parameter Description | Units | Reference Frame |
|---|---|---|
| Aircraft Goal Point-Forward from Origin | Meters | Local PBEG |
| Aircraft Goal Point-Lateral from Origin (Positive Right) | Meters | Local PBEG |
| Aircraft Goal Point - Altitude above Origin | Meters | Local PBEG |
| Aircraft Forward Velocity Goal (X-Direction) | Meters/Second | Local PBEG |
| Aircraft Lateral Velocity Goal (Y-Direction) | Meters/Second | Local PBEG |
| Aircraft Vertical Velocity Goal (Z-Direction) | Meters/Second | Local PBEG |
| Aircraft Roll Angle Goal | Degrees | Local PBEG |
| Aircraft Elevation Angle Goal (Pitch) | Degrees | Local PBEG |
| Aircraft Yaw Angle Goal (Heading) | Degrees | Local PBEG |
| Aircraft Roll Rate Goal | Degrees/Second | Local PBEG |
| Aircraft Pitch Rate Goal | Degrees/Second | Local PBEG |
| Aircraft Heading Rate Goal | Degrees/Second | Local PBEG |
| Boom Goal Point-Forward from Aircraft Origin | Meters | Aircraft Body |
| Boom Goal Point-Lateral from Aircraft Origin | Meters | Aircraft Body |
| Boom Goal Point-Altitude above Aircraft Origin | Meters | Aircraft Body |
| Forward Boom Velocity Goal (X-Direction) | Meters/Second | Aircraft Body |
| Lateral Boom Velocity Goal (Y-Direction) | Meters/Second | Aircraft Body |
| Vertical Boom Velocity Goal (Z-Direction) | Meters/Second | Aircraft Body |
| Boom Extension Value | Meters | Boom |

Slave controller 27 compares the state goal (position, orientation, velocity and rotational rates) to the current state from the synchronizer, and determines the forces to apply to the physical aircraft model of the tanker in the local physics data to cause the tanker to proceed to or approach the state goal. The slave controller 27 also determines the forces needed to move the boom to the defined position and relative velocities and rates of rotation to the state goal relative to the receiver aircraft body. The slave controller inputs are according to the format set out in Table 3.

TABLE 3

SLAVE CONTROLLER INPUTS

| Parameter Description | Units | Reference Frame |
|---|---|---|
| Forward from Origin | Meters | Local PBEG |
| Lateral from Origin (Positive Right) | Meters | Local PBEG |
| Altitude above Origin | Meters | Local PBEG |
| Forward Velocity (X-Direction) | Meters/Second | Local PBEG |
| Lateral Velocity (Y-Direction) | Meters/Second | Local PBEG |
| Vertical Velocity (Z-Direction) | Meters/Second | Local PBEG |
| Aircraft Roll Angle | Degrees | Local PBEG |
| Aircraft Elevation Angle (Pitch) | Degrees | Local PBEG |
| Aircraft Yaw Angle (Heading) | Degrees | Local PBEG |
| Aircraft Roll Rate | Degrees/Second | Local PBEG |
| Aircraft Pitch Rate | Degrees/Second | Local PBEG |
| Aircraft Heading Rate | Degrees/Second | Local PBEG |
| Boom Goal Point-Forward from Aircraft Origin | Meters | Aircraft Body |
| Boom Goal Point-Lateral from Aircraft Origin | Meters | Aircraft Body |
| Boom Goal Point-Altitude above Aircraft Origin* | Meters | Aircraft Body |
| Forward Boom Velocity Goal (X-Direction)* | Meters/Second | Aircraft Body |

TABLE 3-continued

SLAVE CONTROLLER INPUTS

| Parameter Description | Units | Reference Frame |
|---|---|---|
| Lateral Boom Velocity Goal (Y-Direction)* | Meters/Second | Aircraft Body |
| Vertical Boom Velocity Goal (Z-Direction)* | Meters/Second | Aircraft Body |
| Boom Extension Value* | Meters | Boom |

The slave controller 27 is preferably a closed loop control that makes a determination based on a difference between the actual position and velocities of the object and its desired position and velocity of that object. In the preferred embodiment, the slave controller is a PD controller or a similar controller that relies on proportional-derivative control, which is well-known in the art, meaning that the control is calculated generally along the lines of the formula Correction=$Kp*\delta+Kd*\delta'$ where $\delta$ represents the difference between the actual position or velocity of the vehicle and $\delta'$ represents the derivative of $\delta$ with respect to time, usually the difference in the value of $\delta$ since the last iteration of the formula, and the values of Kp and Kd are constant coefficients that are specific to the particular axis or movement involved. The slave controller works in body coordinates, and the slave controller converts all inputs into the aircraft reference frame. Forces applied by the slave controller increase with the amount of correction required.

The slave controller operates using separate scale parameters on the position and velocity differences (Kp and Kd) in determination of the forces. Those parameters Kp and Kd are respectively coefficients multiplied by the position difference value and the velocity and rate differences, as well known in the art in regard to PD controllers. The values of Kp and Kd are preferably specific to the axis of displacement or rotation, and to the displacement or rate of movement. In other words, the values of Kp and Kd may be unique and different for each of the respective PD controller determinations for x-axis position, y-axis position, z-axis position, rotational position about the x-axis, rotational position about the y-axis, rotational position about the z-axis, x-axis velocity, y-axis velocity, z-axis velocity, rotational rate about the x-axis, rotational rate about the y-axis, and rotational rate about the z-axis, making twelve possible values for Kp(i), i=1 to 12, and twelve possible values for Kd(i), i=1 to 12, for each determination of correction for the PD controller. Furthermore, these coefficients Kp and Kd can be adjusted or tuned by an administrator of the system so as to attain a desirable quality of operation of the synchronizer given the specific circumstances, e.g., the latency encountered in the system. The output of the slave controller is according to the format and units set out in Table 4.

TABLE 4

SLAVE CONTROLLER OUTPUTS

| Parameter Description | Units | Reference Frame |
|---|---|---|
| Forward Force on Aircraft | Kg m/s/s | Aircraft Body |
| Lateral Force on Aircraft (Positive Right) | Kg m/s/s | Aircraft Body |
| Vertical Force on Aircraft (Positive Up) | Kg m/s/s | Aircraft Body |

TABLE 4-continued

SLAVE CONTROLLER OUTPUTS

| Parameter Description | Units | Reference Frame |
|---|---|---|
| Torque about the forward vertical axis (Yaw Positive Right) | Kg m$^2$/s$^2$ | Aircraft Body |
| Torque about the lateral axis (Pitch Positive Down) | Kg m$^2$/s$^2$ | Aircraft Body |
| Torque about the forward axis (Roll positive right wing down) | Kg m$^2$/s$^2$ | Aircraft Body |
| Forward Force on Boom (at nozzle) | Kg m/s/s | Boom Body |
| Lateral Force on Boom (at nozzle) | Kg m/s/s | Boom Body |
| Vertical Force on Boom (at nozzle) | Kg m/s/s | Boom Body |
| Boom Extension Value | Meters | Boom Body |

The force data are output to the PhysX dynamics module 29, the local physics engine. In one embodiment of the invention, the movement of the slave vehicle is controlled by the physics engine using three dimensions of forces and three axes of torque to be applied to the vehicle body to move it to the desired position. In another embodiment, the PhysX dynamics module 29 applies the linear forces and rotational torques from the slave controller to a six degree of freedom (6-DOF) aerodynamic model to determine (by a calculation such as F ma) acceleration of the model. Integrators are then applied to convert the accelerations into velocities and rotation rates and then into position and orientation angles so that the slave aircraft moves to the desired position within the parameters of the realistic aircraft operation (i.e., corrective movements do not exceed realistic movement of the aircraft) and using the aerodynamic model of the aircraft so that the aircraft movement in the simulated is faithful to the appearance of movement of the real aircraft. A coordinate transformation is also applied to convert from the body reference frame to position and orientation relative to the PBEG local coordinate system. This becomes the current state of the slave tanker aircraft, and is looped back to cooperative control 25 and the slave controller 27 for subsequent duty cycles. The model parameters such as mass are adjustable to tune the response of the model to external forces.

The PBEG HD system hardware utilizes the NVIDIA PhysX physics computational engine to perform physics calculations.

The format of the output of the physics engine is set out in Table 5,

TABLE 5

PHYSX DYNAMICS OUTPUTS

| Parameter Description | Units | Reference Frame |
|---|---|---|
| Aircraft Position Forward from Origin | Meters | Local PBEG |
| Aircraft Position Lateral from Origin (Positive Right) | Meters | Local PBEG |
| Aircraft Position Altitude above Origin | Meters | Local PBEG |
| Forward Aircraft Velocity (X-Direction) | Meters/Second | Local PBEG |
| Lateral Aircraft Velocity (Y-Direction) | Meters/Second | Local PBEG |
| Vertical Aircraft Velocity (Z-Direction) | Meters/Second | Local PBEG |
| Aircraft Roll Angle | Degrees | Local PBEG |
| Aircraft Elevation Angle (Pitch) | Degrees | Local PBEG |
| Aircraft Yaw Angle (Heading) | Degrees | Local PBEG |

TABLE 5-continued

PHYSX DYNAMICS OUTPUTS

| Parameter Description | Units | Reference Frame |
|---|---|---|
| Aircraft Roll Rate | Degrees/Second | Local PBEG |
| Aircraft Pitch Rate | Degrees/Second | Local PBEG |
| Aircraft Heading Rate | Degrees/Second | Local PBEG |
| Relative Boom Position-Forward/Aft | Meters | Aircraft Body |
| Relative Boom Position-Lateral | Meters | Aircraft Body |
| Relative Boom Position-Vertical | Meters | Aircraft Body |
| Boom Extension Value | Meters | Boom Body |

The current slave tanker state data is transferred to IG (image generator) interface 31, which provides the current tanker state to the scene data used in the receiver simulator's visual system 18. The IG interface provides the tanker aircraft (including boom) state to the image generator of the receiver visual system 18 immediately upon receipt of a request for the information in an appropriate format for transfer of the data to the IG for incorporation into the scene data.

Referring again to FIG. 4, the Master Receiver flight simulator or host 19 provides man-in-the-loop control for the receiver pilot. The receiver master may consist of several subsystems or may be contained within a single PC. One embodiment consists of a single node PC running X-Plane software to provide the entire Master Receiver simulation. The Master Receiver Flight simulator 19 provides an aerodynamic flight model that determines the proper aircraft state in response to flight control inputs from the pilot, and preferably relies on the local physics engine in simulating the receiver ownship operation. Cockpit flight instruments and displays are provided by the master receiver flight simulator host 19 for the pilot as well. The master receiver host 19 and the PBEG HD passes the receiver and the tanker slave state data to the receiver visual system 18 in a format similar to that of Table 5, where the data is incorporated into the rendering process of the image generator in the visual system 18.

The Master Receiver Flight simulator 19 transmits the master receiver state data of Table 6 to the tanker simulator over the network via DMO interface 33. The relative displacements and rotations of the receiver aircraft relative to the slave tanker as set out in Table 6 are also transmitted from slave tanker synchronizer 17 through DMO interface 33 to the tanker simulator station 13. The Master Receiver Flight simulator 19 also transmits data defining the relative velocity between the master receiver and the slave tanker in the three virtual world coordinate axes, and also the relative rotational rate around each of those axes, as set out in Table 6.

The relative displacements and rotations of the receiver aircraft relative to the tanker slave state data and the master receiver state data are received by a slave receiver synchronizer 21 at a cooperative control 35. This data is in a format as seen in Table 6 below.

TABLE 6

COOPERATIVE CONTROL FOR SLAVE RECEIVER SYNCHRONIZER INPUTS

| Parameter Description | Units | Reference Frame |
|---|---|---|
| Relative displacement State-Latitude | Degrees | Round Earth |
| Relative displacement State-Longitude | Degrees | Round Earth |
| Relative displacement State-Altitude above Mean Sea Level (MSL) | Meters | Round Earth |
| Relative Velocity-East | Meters/Second | Round Earth |
| Relative Velocity-North | Meters/Second | Round Earth |
| Relative Velocity-Vertical | Meters/Second | Round Earth |
| Relative orientation State-Roll Angle | Degrees | Round Earth |
| Relative orientation State-Elevation Angle (Pitch) | Degrees | Round Earth |
| Relative orientation State-Yaw Angle (Heading) | Degrees | Round Earth |
| Relative Velocity-Roll Rate | Degrees/Second | Round Earth |
| Relative Velocity-Pitch Rate | Degrees/Second | Round Earth |
| Relative Velocity-Heading Rate | Degrees/Second | Round Earth |
| (Master) Tanker State-Latitude | Degrees | Round Earth |
| (Master) Tanker State-Longitude | Degrees | Round Earth |
| (Master) Tanker State-Altitude above Mean Sea Level (MSL) | Meters | Round Earth |
| (Master) Tanker State-Velocity relative to East | Meters/Second | Round Earth |
| (Master) Tanker State-Velocity relative to North | Meters/Second | Round Earth |
| (Master) Tanker State-Vertical Velocity | Meters/Second | Round Earth |
| (Master) Tanker State-Aircraft Roll Angle | Degrees | Round Earth |
| (Master) Tanker State-Aircraft Elevation Angle (Pitch) | Degrees | Round Earth |
| (Master) Tanker State-Aircraft Yaw Angle (Heading) | Degrees | Round Earth |
| (Master) Tanker State-Aircraft Roll Rate | Degrees/Second | Round Earth |
| (Master) Tanker State-Aircraft Pitch Rate | Degrees/Second | Round Earth |
| (Master) Tanker State-Aircraft Heading Rate | Degrees/Second | Round Earth |

Note:
The relative states (relative displacement, relative orientation, and relative velocities) are the differences between the states of the master receiver and slave tanker at simulation station 11.

Figure 6:
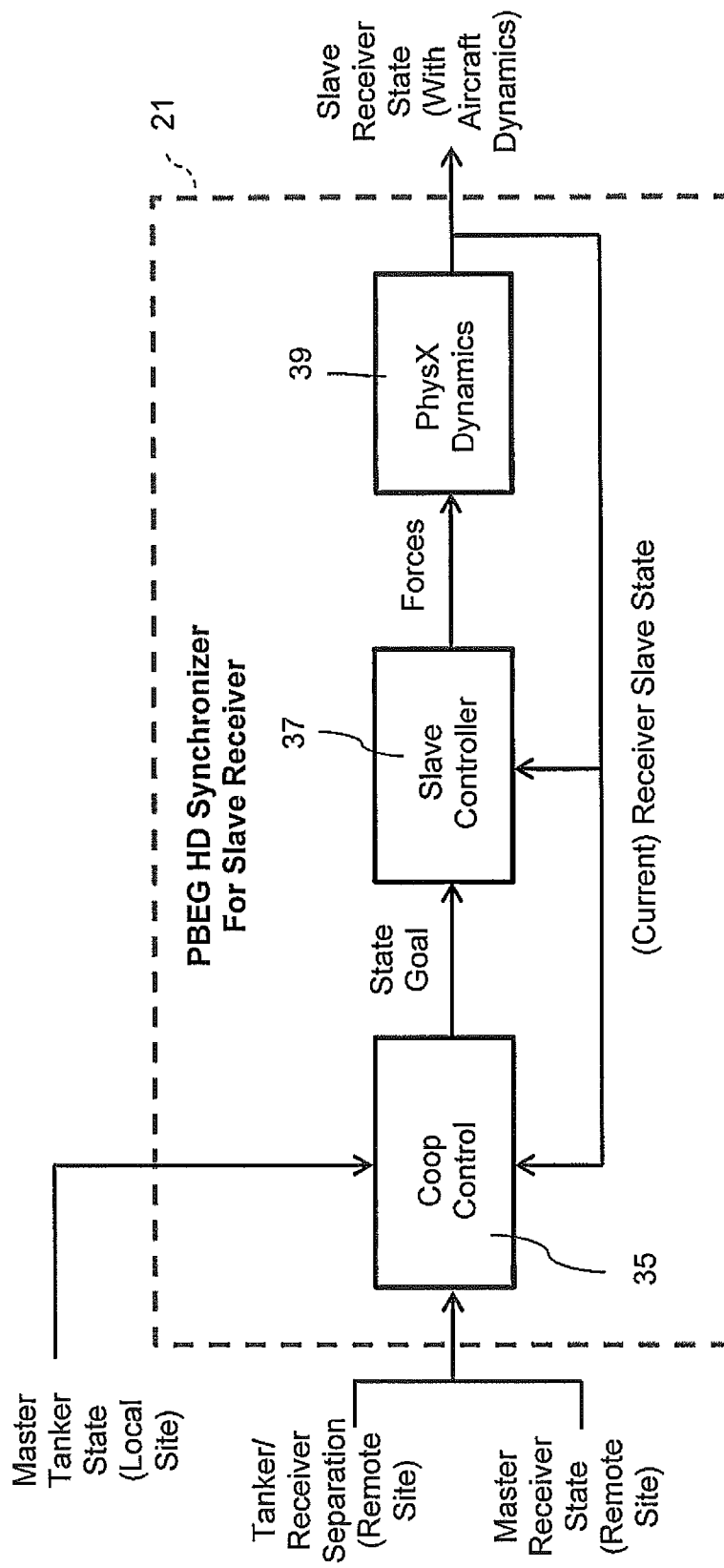
FIG. 6 is a schematic diagram of the operation of a slave synchronizer for the receiver aircraft in a simulator remote from the receiver aircraft simulator.

As best seen in FIG. 6. the PBEG HD Receiver Slave 21 computes the state of the remote receiver aircraft using realistic physical dynamics in response to local and remote inputs. All functional components operate synchronized at a minimum 60 Hz update rate. The PBEG HD Receiver Slave includes a cooperative control that uses the current master receiver position (as defined in the local scene data of the tanker simulator), the separation between the slave tanker and master receiver (received from the remote simulator for the receiver aircraft) to determine the receiver slave state goal for use by the slave controller. The general principle is that the receiver slave synchronizer acts to move the virtual receiver aircraft to a desired position that is the same relative displacement from the tanker aircraft position (and changing at the same rates) as in the receiver simulator when the relative position data of Table 6 was sent over the network 9. The cooperative control 35 calculates the appropriate position for the receiver based on the position of the tanker locally and the relative position of the receiver with respect to the tanker received from the receiver simulator over the network 9 (seen in FIG. 4).

The cooperative control 35 includes a PD controller that makes the signal or incoming data stream stable. An algorithm is used that is configured to at least partly synchronize the incoming data with that of the slave receiver. This is done by including in the PD controller an additional gain, scaled by a coefficient constant Kc multiplied by the difference between the slave receiver state and the adjusted master receiver state, which is obtained by combining the current local state of the tanker with the received relative state of the master receiver relative to the tanker in the receiver simulator. This coefficient can be different and unique for each of the separate coordinate axes and rotations thereabout, as discussed above, and also may be adjusted by an administrator to tune the system.

The receiver simulator may also transmit the master receiver orientation, velocity and rotational rates from the receiver simulator to the tanker simulator. These are used in situations where the receiver aircraft is far enough away from the tanker that the synchronizer does not need to use relative distances, but simply acts to bring the receiver slave position to match the receiver aircraft master position received from the receiver simulator.

It may be desirable to also use the master receiver position and location in combination with the relative positioning, by multiplying each desired position by a coefficient parameter that scales the amount of weight that it is afforded in the calculation. The cooperative control 35 allows for an operator administrator to adjust the parameters to tune the relative strengths of the tanker/receiver separation and master receiver state in determination of the output state goal.

The cooperative control 35 outputs state goal data to slave controller 37 according to the format and units of Table 7.

TABLE 7

COOPERATIVE CONTROL FOR SLAVE RECEIVER SYNCHRONIZER OUTPUTS

| Parameter Description | Units | Reference Frame |
|---|---|---|
| Goal Point - Forward from Origin | Meters | Local PBEG |
| Goal Point - Lateral from Origin (Positive Right) | Meters | Local PBEG |
| Goal Point - Altitude above Origin | Meters | Local PBEG |
| Forward Velocity Goal (X-Direction) | Meters/Second | Local PBEG |
| Lateral Velocity Goal (Y-Direction) | Meters/Second | Local PBEG |
| Vertical Velocity Goal (Z-Direction) | Meters/Second | Local PBEG |
| Aircraft Roll Angle Goal | Degrees | Local PBEG |
| Aircraft Elevation Angle Goal (Pitch) | Degrees | Local PBEG |
| Aircraft Yaw Angle Goal (Heading) | Degrees | Local PBEG |
| Aircraft Roll Rate Goal | Degrees/Second | Local PBEG |
| Aircraft Pitch Rate Goal | Degrees/Second | Local PBEG |
| Aircraft Heading Rate Goal | Degrees/Second | Local PBEG |

The slave controller 37 of the slave receiver synchronizer 21 is a closed loop controller that is similar to the slave controller 27 of tanker synchronizer 17, and generates force data from the state goal data and the current receiver slave state data. This force data is similar in format and units to the force data for the tanker and boom shown in Table 4, except no data is provided or needed for the boom. As with slave controller 27, slave controller 37 is a PD controller or a controller that operates similarly to a PD controller. The slave controller 37 converts all inputs into the aircraft reference frame. Forces applied by the slave controller 37 increase with the amount of correction required. The slave controller also operates using separate operator-tunable parameters on the position and velocity differences (Kp and Kd) in determination of the forces, and, as discussed above, these coefficients Kp and Kd may be different for each of the coordinate axes, and the rotations thereabout, as well as for the linear and rotational velocities with respect to those axes, making a possible twelve different values for each coefficient. Generally, the slave controller 37 ensures that corrective forces do not cause the aircraft to overshoot its correction, but rather cause it to approach and smoothly reach the desired location and orientation, which is the defined relative position with respect to the tanker when the receiver is in proximity to the tanker.

The force output of the slave controller 37 passes to the physics engine 39, which is essentially the same as the physics engine 29 discussed above. The output of physics engine 39 is the slave receiver state data. The format and units are similar to those of Table 5, except that the aircraft is the receiver not the tanker, and there is no boom data.

The slave receiver state data is fed back to the slave controller and the cooperative control to be used in the subsequent pass of the control cycle. In addition, the slave receiver state data is transmitted to IG interface 41, essentially the same as IG interface 31, which feeds the slave receiver state data to the image generator, causing the receiver aircraft to be positioned in the virtual environment in a correct position, i.e., spaced and oriented relative to the master tanker at a distance and set of rotations corresponding to the relative position of the master receiver and the slave tanker in the receiver simulator virtual environment, with of course some variation due to the synchronizer processing.

Figure 7:
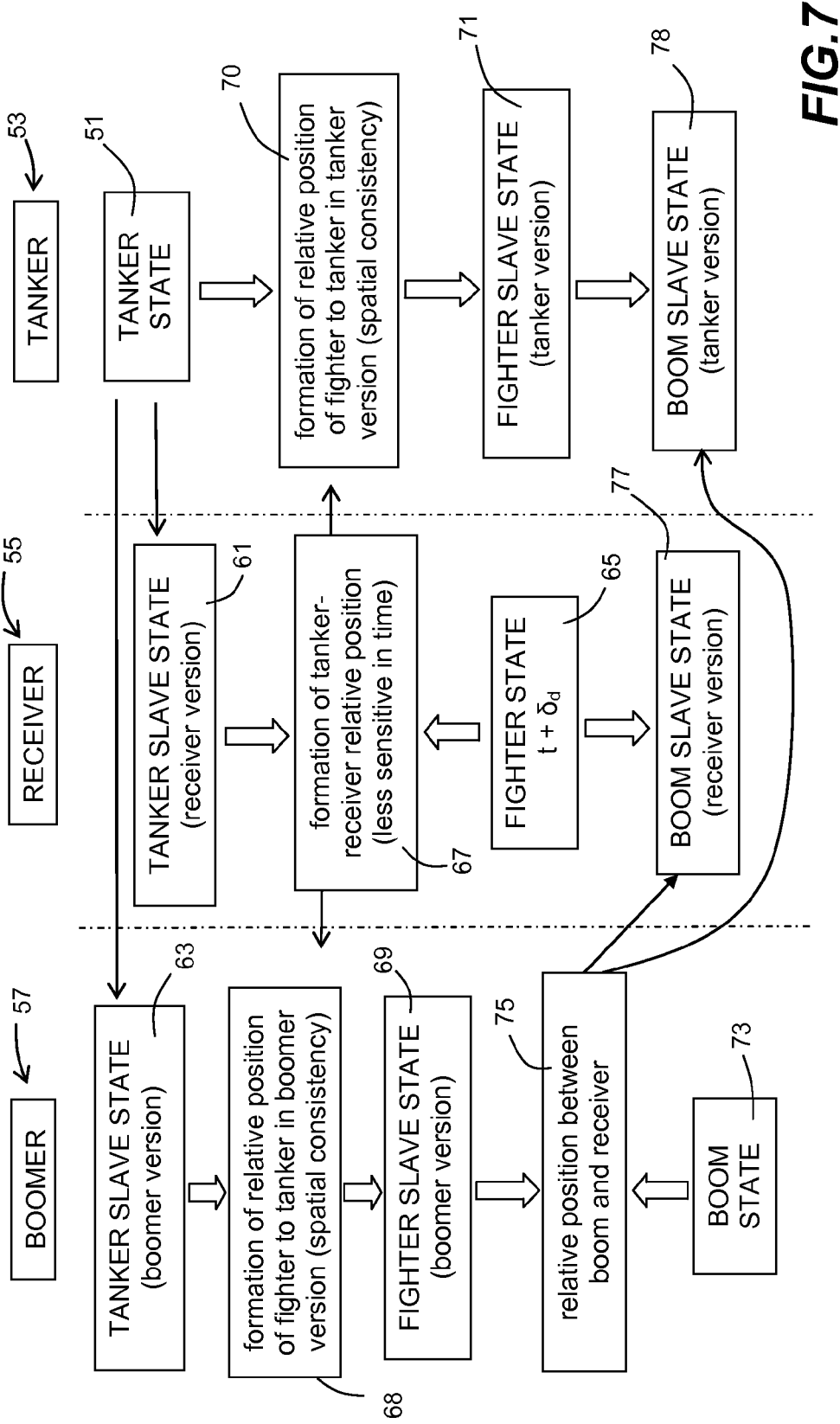
FIG. 7 is a schematic diagram showing operation of the system with multiple entities, in this example a tanker, a receiver and a boomer.

Referring to FIG. 7 an alternate embodiment is illustrated in which the tanker, receiver and boomer simulation stations are all geographically remote from each other and subject to latency in communications between them.

In this embodiment, the master tanker state 51 is produced by the man-in-loop at the tanker simulator indicated at 53. The tanker state data is sent over the network to the receiver simulator station 55 and the boomer simulator station 57 to produce, through synchronizers, local tanker slave states 61 and 63 at both of those stations.

At the receiver simulation station 55, the master fighter (i.e., the receiver aircraft, which is often a fighter jet) state 65 is determined from the man-in-loop simulation there. The receiver simulator system determines a relative position and orientation 67 of the master fighter state to the slave tanker state 61 at the receiver station 55.

The relative position 67 of the fighter to the tanker is then sent to the tanker and boomer simulator stations and integrated into their environments by synchronizers 68, 70 so that each has a fighter slave state 69 and 71 that is spaced from the tanker in that environment by the relative distance 67 defined.

The master boom position state 73 is then determined from the man-in-loop simulator at the boomer simulation station. From this boom state 73, a relative position 75 of the boom to the fighter/receiver aircraft is determined. This relative boom position is then sent to the receiver and tanker simulation stations, where it is incorporated by a synchronizer into the local scene data such that the relationship of the boom slave state 77, 78 to the fighter/receiver state 65,71 is the same in those simulation stations 55, 53.

This system allows for a distributed training of all three pilots or operators involved in aerial refueling exercises.

The relative-position control system described here is used only when the aircraft are close together, i.e., when one vehicle enters into a predefined proximity space around another vehicle. In the aerial refueling context, the relative position control system is activated only when the position of the receiver aircraft in the virtual environment enters into the proximity space constituting a trailing conical refueling airspace behind the tanker. This apex of the cone is in the rear portion of the tanker, and the axis of the cone extends along the longitudinal axis of the tanker. When the receiver is outside of that conical refueling space, the slave synchronizer for the receiver aircraft in the tanker simulator is sent position data for the receiver aircraft that is used to position the receiver aircraft in the virtual space according to the usual PBEG processes for entities in the simulation. When the receiver aircraft enters into the conical refueling space, the receiver simulator starts transmitting relative displacement, relative rotational orientation, relative velocity and relative rotational rates to the tanker simulator over the network. The slave synchronizer in the tanker simulation system 3 then operates as described above, moving the slave receiver to a position relative to the master tanker corresponding to the relative position and orientation received from the master simulation at receiver simulation station 11.

It must be stressed that while the disclosure here has been directed to training of in-flight refueling operations, the invention is not so narrowly applicable. Rather, the invention here may be applied to any distributed system where two or more vehicles are in close proximity in the simulated environment, and latency in the communications between the actual simulator stations for those vehicles may produce a problem. Those situations may be aerial refueling (piloted or autonomous), flying in formation or simple station-keeping, or hot pursuit of one aircraft by another in a dogfight. In those situations, one aircraft would be controlled like the tanker in the embodiments discussed here, and the other aircraft as the receiver aircraft.

The proposed technique can also be applied to remote operation of autonomous vehicles by several operators at different geographical locations, autonomous operation of man-vehicle systems, etc. While master-slave configuration has been used to control a remote device such as tele-robotics, the proposed invention is the first dealing with networked synchronization of multiple heterogeneous entities at different locations. The synchronization technique used in the invention already includes output state signals from the master systems for the remote PBEG HD synchronizers and, by further incorporating masters' input state signals, the synchronization performance can be improved.

The present embodiment has shown two or more distributed simulators each having a human user. However, the techniques of the invention can also be advantageously applied in systems where there is one human user on a simulator, and that user is interacting at close range with another vehicle or entity that is automatically controlled by a remote computer over a network, with consequent latency. For example, a user may control a receiver aircraft in a refueling exercise where a remote computer controls flight of a tanker aircraft, or a user may control the boom in a refueling exercise where both the tanker and the receiver aircraft are otherwise controlled by a computer without human involvement. In other areas of simulation, a computer may control an interactive adversary force that reacts according to predetermined programming to a human controlled entity.

In such a system, generally, the operation is similar to those described above, except that the man-in-loop simulator and its supportive systems, e.g., a dummy cockpit, an image generator, and out-the-window scene displays, are unnecessary. The entity-controlling computer may not have an image generator, but can be simply a computer system running software stored therein that, based on local scene data defining the virtual world as discussed above, controls the movement of the associated entity in response to human controlled movement or actions.

Where the entity is controlled by a remote computer, the remote computer transmits authoritative position data for the entity over the network to the simulator being accessed by the human user, and the human user simulator implements a slave managing component for the entity that positions the controlled entity in the local version of scene data stored at the simulator with a slave synchronizer as described above. The simulator then sends data defining the relative position of the simulator ownship relative to the entity back over the network to the remote computer. The remote computer uses the data defining a relative position of the human-controlled vehicle with respect to the controlled entity in its own scene data, relying on that position for its processing of reactive behavior of the controlled entity.

It should also be understood that the preferred embodiment is directed to human-controlled simulators of vehicles interacting at close range, but the entities that are simulated may also be types of entities other than a vehicle, including a physical model of a human, or any other type of controllable moving object.

The terms herein should be read as terms of description not limitation, as those of skill in the art with this disclosure before them will be able to make changes and modifications therein without departing from the scope of the invention.

What is claimed is:

1. A system for providing a shared simulation environment, said system comprising:

first and second simulators each associated with a respective user and linked over a network so as to communicate with each other;

said simulators each including a data storage system storing a respective version of time-varying scene data thereon including data defining positions of virtual objects in the simulation environment, a computerized image generator accessing the scene data and generating therefrom video in real-time as a stream of images each rendered based on the scene data, and a display that receives and displays said video from said image generator;

said first and second simulators simulating, respectively, first and second vehicles in the respective versions of the simulation environment so as to be controlled by the respective users;

the first simulator continually determining a time-varying position of the first vehicle according to spatial coordinates in the simulation environment and modifying the version of the scene data of the first simulator such that the video displayed at the display device thereof reflects the position of said first vehicle determined by the first simulator;

the first simulator transmitting over the network first authoritative position data defining the position of the first vehicle as determined by the first simulator at a time of said transmission;

the second simulator receiving the first authoritative position data over the network and modifying the scene data of the second simulator so as to move the first vehicle to or toward the position defined by the first authoritative position data in the version of the scene data stored at the second simulator, whereby the first vehicle has a current local position defined in the version of the scene data of the second simulator;

the second simulator continually determining a time-varying position of the second vehicle and modifying the scene data of the second simulator such that the video displayed at the display device thereof reflects the position of said second vehicle;

the second simulator transmitting over the network authoritative relative position data that defines, or from which can be derived, a current relative displacement of a current position of the second vehicle in the second simulator version of the scene data with respect to the position of the first vehicle as determined by the second simulator in the version of the scene data of the second simulator at a time of transmission of the authoritative relative position data; and the first simulator receiving the authoritative relative position data over the network and modifying the version of the scene data of the first simulator so as to move the second vehicle to or toward a position in the first simulator version of the scene data that is displaced relative to the position of the first vehicle as determined by the first simulator at a time of said receipt of the authoritative relative position data in the first simulator version of the scene data by the relative displacement of the authoritative relative position data received from the second simulator.

2. The system of claim 1, wherein the simulators each have therein a physics engine component having at least one physics engine and the simulation of the vehicles relies at least in part on operation of the vehicles as physical models governed by physics rules of the physics engine components.

3. The system of claim 2, wherein the first and second simulators each have a respective master manager component associated with the vehicle being simulated thereby, and a slave manager component associated with the vehicle being simulated by the other of said simulators, said master manager component of the first simulator determining the position for the first vehicle, and the slave manager component of the first simulator receiving the authoritative relative position data for the second vehicle and causing the physics engine component of the first simulator to apply forces to the second vehicle within the physics rules that are configured to move the second vehicle to or toward the position relative to the first vehicle in the simulation environment corresponding to the relative displacement of the authoritative relative position data received.

4. The system of claim 3, wherein the authoritative relative position data includes data defining relative displacement of the vehicles from each other and data defining relative rotational orientation of the second vehicles relative to the first vehicle.

5. The system of claim 4, wherein the second simulator also transmits rate data indicative of a relative velocity of linear movement and rotation of the first vehicle relative to the second vehicle, and the slave manager component of the first simulator causes the physics engine component thereof to apply to the second vehicle therein physical forces that are configured to cause the second vehicle to reach the relative velocity of linear movement and rotation in addition to the relative position compared to the first vehicle in the first simulator scene data.

6. The system of claim 5, wherein the forces of the slave manager component are determined using a PD controller that is supplied with a state goal for the vehicle associated with the slave manager component.

7. The system of claim 3, wherein the master manager component of the second simulator only transmits the authoritative relative position data defining relative positions between the vehicles when the second vehicle is in a predefined proximity space around the first vehicle, and
when the second vehicle is not in the proximity space, the second simulator transmits second authoritative position data defining the position of the second vehicle according to the spatial coordinates in the shared simulation environment; and
the slave manager component of the first simulator causes the version of the scene data of the first simulator to reflect movement of the second vehicle to or toward the position of the second vehicle according to the spatial coordinates of the shared simulation environment independent of the position of the first vehicle in the scene data of the first simulator.

8. The system of claim 1, wherein the vehicles being simulated are aircraft moving in three dimensions.

9. The system of claim 8, wherein the first vehicle being simulated is a tanker and the second vehicle is a receiver aircraft to be refueled.

10. The system of claim 9, wherein a third simulator simulates the operation of a boom on the tanker to train a third user in operation of the boom during refueling, and said third simulator transmits authoritative relative boom data defining a relative position between the boom and the receiver aircraft over the network to the first and second simulators, and the first and second simulators each have a slave manager component for the boom that moves the boom to or toward the relative position defined by the authoritative relative boom data with respect to the position of the receiver aircraft as currently defined in the respective versions of the scene data.

11. A method for providing an interactive simulation of a shared virtual environment to a plurality of users, said method comprising:
providing to each of said users a respective simulator station simulating a respective vehicle controlled by the user, each of said simulation stations having a display displaying to the associated user video rendered by a respective computerized image generator thereof from respective scene data defining a respective version of the shared virtual environment stored in a respective computer accessible data storage system;
determining at a first of the simulator stations an authoritative position of the vehicle simulated thereby according to spatial coordinates in the virtual environment of the interactive simulation and modifying the scene data at said simulation station so that the position in the virtual environment of the vehicle defined thereby corresponds to the authoritative position;
transmitting authoritative position data defining the authoritative position of the vehicle from the first simulation station over a network connecting the simulation stations;
receiving over the network at a second of the simulation stations the authoritative position data;
modifying the scene data at said second simulation station so as to move the vehicle simulated by the first simulation station to or toward the authoritative position in the version of the shared virtual environment defined by the scene data of the second simulation station, resulting in the vehicle simulated by the first simulation station having a current local position in the version of the shared virtual environment defined by the scene data of the second simulation station;
determining at the second simulator station a current position of the vehicle simulated thereby in an environment of the interactive simulation and modifying the scene data at said second simulation station so that the position in the virtual environment of the vehicle defined thereby corresponds to said current position;
transmitting over the network authoritative relative position data that defines, or from which can be derived, a relative displacement of the current position of the vehicle simulated by the second simulation station with respect to the current local position of the vehicle simulated by the first simulation station in the version of the shared virtual environment as defined by the scene data of the second simulation station;
receiving the authoritative relative position data at the first simulation station; and
modifying the scene data of the first simulation station such that, in the version of the shared virtual environment defined by the scene data thereof, the vehicle of the second simulation station is moved into or toward a position in the virtual environment that is displaced from a current position of the vehicle of the first simulation station as currently determined defined by the first simulation station by the relative displacement defined by the authoritative relative position data.

12. The method of claim 11, wherein the simulator stations each have therein a physics engine component including at least one physics engine and controlling movement of virtual objects and the simulated vehicles in the respective version of the shared virtual environment according to data defining physical properties of the virtual objects and the simulated vehicles according to predetermined physics rules applied in the physics engine component, and
  wherein the modifying of the scene data at the second simulation system includes determining and applying forces to a physics-based model of the vehicle according to the physics rules in the physics engine component.

13. The method of claim 12, wherein the first and second simulation stations each have a respective host manager component associated with the vehicle being simulated thereby, and a slave manager component associated with the vehicle being simulated by the other of said simulation stations, and
  wherein the modifying of the scene data of the first simulation station is achieved by the slave manager component of the first simulation station receiving the authoritative relative position data for the vehicle simulated by the second simulation station and determining based thereon forces configured to cause the physics engine component to move the vehicle simulated by the second simulation station to or toward the position relative to the vehicle simulated by the first simulation station corresponding to the relative displacement defined by the authoritative relative position data.

14. The method of claim 13, wherein the authoritative relative position data further includes data defining relative displacement of the vehicles from each other and data defining relative rotational orientation of the vehicles relative to each other, and the modifying of the scene data includes the slave manager applying forces to the vehicle simulated by the second simulation station in the physics engine component configured to rotate the vehicle simulated by the second simulation station to or toward the defined relative rotation thereof.

15. The method of claim 14, wherein the second simulation station also transmits rate data indicative of the relative velocity of linear movement and rotation of the vehicle simulated by the second simulation station relative to the vehicle simulated by the first simulation station, and the slave manager of the first simulation station determines forces that are supplied to the physics engine that are configured to cause the vehicle simulated by the second simulation station to reach the relative velocities of linear movement and rotation in addition to the relative position compared to the vehicle simulated by the first simulation station in the first simulation station scene data.

16. The method of claim 15, wherein the forces of the slave manager component are determined using a PD controller that is supplied with a state goal for the vehicle associated with the slave manager component derived from the authoritative relative position data and the current position of the vehicle simulated by the second simulation station in the scene data of the first simulation station.

17. The method of claim 13, wherein the master manager component of the second simulation station only transmits the authoritative relative position data defining relative positions between the vehicles when the position of the vehicle simulated by the second simulation station is in a predefined proximity space around the vehicle simulated by the second simulation station, and
  when the second vehicle is not in the proximity space, the second simulation station transmits second authoritative position data defining the position of the vehicle simulated by the second simulation station in coordinates relative to the shared virtual environment, and the first simulation station modifies the scene data of the first simulation station such that, in the version of the shared virtual environment defined by the scene data thereof, the vehicle of the second simulation station is moved into or toward the position defined by the second authoritative position data independent of the position of the vehicle of the first simulation station.

18. The method of claim 11, wherein the vehicles being simulated are aircraft moving in three dimensions.

19. The method of claim 18, wherein the vehicle being simulated by the first simulation station is a tanker and the vehicle simulated by the second simulation station is a receiver aircraft to be refueled.

20. The method of claim 19, and further comprising
  simulating at a third simulation station connected with the network the operation of a boom on the tanker so as to train a third user in operation of the boom during refueling, and
  transmitting from third simulator system authoritative relative boom position data defining a relative displacement between the boom and the receiver aircraft to the first and second simulation stations, wherein the first and second simulation stations each have a slave manager component for the boom that moves the respective position of the boom in respective version of the virtual environment to or toward a respective position that is displaced by the relative displacement defined by the authoritative relative boom position data from the respective current position in the virtual environment of the receiver aircraft in the respective versions of the scene data.

21. A simulation station for use in a simulation system for a plurality of users each associated with a respective simulation station simulating a respective entity, said simulation station comprising:
  a link to a communication network to which the simulation stations are linked;
  computer accessible data storage storing scene data, the scene data including object data defining a plurality of virtual objects in a virtual environment, said object data including, for each of said virtual objects, location data defining a location of the virtual object in the virtual environment;
  an image generator generating video comprising sequential frames of video imagery periodically rendered in real time from said scene data and corresponding to a view of the virtual environment from a time-varying view position associated with the location of one of the virtual objects, said one of the virtual objects being a hosted entity that is simulated by the simulation station so that the user is provided with a real time view of the virtual environment from said view position; and
  a display receiving the video imagery and displaying said imagery so as to be viewable by the associated user;
  a physics engine component having at least one physics engine and managing physics data for the virtual objects in the scene data by determining physics data for a subset of the virtual objects in the scene based on physical attribute data defining virtual physical parameters of each of said virtual objects and physical rules of motion of the physics engine component;
  said physics engine being connected with the data storage and influencing said scene data so that the location data of the virtual objects as defined in the scene data comply with the physical rules governing, based at least in part on the physical attribute data thereof, the movement thereof in the virtual environment, a computer-supported host controller component continually determining a time-varying authoritative position and orientation in the virtual environment for the hosted entity, and transmitting authoritative position data defining said authoritative position and orientation as determined by the host controller at a time of said transmission over the communication network through the link in a form configured to be received by at least one other simulation system;

a computer-supported slave managing component associated with another entity, said another entity being located in the virtual environment in a predetermined proximity space associated with the hosted entity;

the slave managing component receiving authoritative relative position data for said another entity via the network, said authoritative relative position data defining a relative position of said another entity with respect to the hosted entity;

the slave managing component determining virtual forces that are applied in the physics engine component to a physical data model of said another entity, said forces causing the physics engine component to modify the scene data such that said another entity moves in the virtual environment to or toward a position displaced from the position of the hosted entity as determined at a time of said receipt of the authoritative relative position data by the first host controller by the relative position defined by the authoritative relative position data received.

22. The simulation station of claim 21, wherein the entities are simulated aircraft moving in three dimensions, and the determination of the forces on the other aircraft is by a PD control loop maintained by the simulation station with at least the following data as inputs:
 a position of the hosted entity in the virtual environment at the time of said receipt of the authoritative relative position data; and
 a displacement defined by the authoritative relative position data.

23. The simulation station of claim 22, wherein said authoritative relative position data defines the relative position of said mother entity with respect to the hosted entity as displacements according to three spatial axes and rotational displacements about each of said axes, and further includes data defining a velocity of said another entity relative to the hosted entity according to the three spatial axes, and rates of relative rotation thereabout;
 the slave managing component determining forces that are applied in the physics engine component to a physical data model of said another entity, said forces causing the physics engine to modify the scene data such that said another entity moves in the virtual environment to or toward a position in which the another entity is rotationally and linearly displaced from the hosted entity, and is accelerated or decelerated to or toward the relative velocities and rates of rotation, as defined by the authoritative relative position data received.

24. A simulation station for use in a simulation system for a plurality of users, said simulation station comprising:
 a link to a communication network;
 computer accessible data storage storing scene data, the scene data including object data defining a plurality of virtual objects in a virtual environment, said object data including, for each of said virtual objects, location data defining a location of the virtual object in the virtual environment;
 an image generator generating video comprising sequential frames of video imagery periodically rendered in real time from said scene data and corresponding to a view of the virtual environment from a position associated with an hosted entity being simulated by the simulation station so that the user is provided with a real time view of the virtual environment; and
 a display receiving the video imagery and displaying said imagery so as to be viewable by the associated user;
 a physics engine component managing physics data for the virtual objects in the scene data by determining physics data for a subset of the virtual objects in the scene based on physical attribute data defining virtual physical parameters of each of said virtual objects and physical rules of motion of the physics engine;
 said physics engine component being connected with the data storage and influencing said scene data so that the location data of the virtual objects as defined in the scene data comply with the physical rules governing, based at least in part on the physical attribute data thereof, the movement thereof in the virtual environment,
 a computer-supported host controller component continually determining a time-varying position and orientation of the hosted entity in the virtual environment;
 a computer-supported slave managing component associated with another entity;
 the slave managing component receiving authoritative position data for said another entity via the network, said authoritative position data defining a position of said another entity in the spatial coordinates in the virtual environment;
 the slave managing component determining forces that are applied in the physics engine component to a physical data model of said another entity, said forces causing the physics engine component to modify the scene data such that said another entity moves in the virtual environment to or toward the position defined by the authoritative position data received so as to reach a time-varying local position and orientation of said another entity in the virtual environment in the scene data of the simulation station; and
 the simulation station transmitting authoritative position data over the communication network through the link in a form configured to be received by another simulation system on the network,
 when the hosted entity is determined to be outside a predetermined proximity space around said another entity, said authoritative position data comprising authoritative absolute position data defining a position of the hosted entity in the spatial coordinates in the virtual environment at a time of transmission of said authoritative absolute position data; and
 when the hosted entity is determined to be in said predetermined proximity space around said another entity, said authoritative position data comprising authoritative relative position data including data defining a relative displacement of the current position and orientation of the hosted entity from the local position of said another entity as defined by the scene data of the simulation station at a time of transmission of said authoritative relative position data.

25. The simulation station of claim 24, wherein the entities are simulated aircraft moving in three dimensions, and the determination of the forces on the other aircraft is by a PD control loop maintained by the simulation station with at least the authoritative position data of the other entity.

26. The simulation station of claim 25, wherein said authoritative relative position data defines the relative position of the hosted entity with respect to said another entity as displacements according to three spatial axes and rotational displacements about each of said axes, and further includes data defining or from which can be derived a velocity of the hosted entity relative to said another entity according to the three spatial axes, and rates of relative rotation thereabout.

27. A system for providing a simulation environment, said system comprising:
    a computer system linked to a network;
    a first simulator associated with a user and linked over the network to the computer system so as to communicate therewith;
    said simulator and said computer system each including a respective data storage system storing a respective version of time-varying scene data thereon including data defining positions of virtual objects in the simulation environment;
    the first simulator having a computerized image generator accessing the scene data and generating therefrom video in real-time as a stream of images each rendered based on the scene data, and a display receiving and displaying said video from said image generator;
    said first simulator continually determining, responsive to inputs from the user, a time-varying position of the first entity in the simulation environment as defined in the version of the scene data of the first simulator;
    the first simulator transmitting first authoritative position data defining said position of the first vehicle at a time of transmission of the first simulator authoritative position data over the network to the computer system;
    the computer system receiving the first authoritative position data and determining responsive to the first authoritative position data a locally determined position in the simulation environment of the first entity, and
    said computer system continually determining a time-varying position of a second entity in the simulation environment;
    the computer system transmitting over the network to the first simulator authoritative relative position data that defines, or from which can be derived, a relative displacement of the position of the second entity as determined by the computer system at a time of transmission of the first simulator authoritative relative position data with respect to the locally determined position in the simulation environment of the first entity at the time of transmission of the first simulator authoritative relative position data; and
    the first simulator receiving the authoritative relative position data and modifying the version of the scene data of the first simulator so as to move the second entity to or toward a position displaced from the position of the first entity in the simulation environment, as determined by the first simulator at a time of receipt of the first simulator authoritative relative position data, by the relative displacement of the authoritative relative position data received.

28. The system of claim 27, wherein the first simulator has a closed loop control processing the authoritative relative position data and yielding therefrom force data applied to a physics engine so as to modify the position of the second entity based on physics data corresponding thereto.

29. The simulation station of claim 21, wherein the hosted entity is simulated as a tanker aircraft configured to refuel other aircraft in flight, and said another entity is simulated as a receiver aircraft configured to be refueled from said tanker aircraft.

30. The simulation station of claim 24, wherein the hosted entity is a simulated receiver aircraft, and said another entity is a simulated tanker aircraft configured to refuel the receiver aircraft in simulation.

31. The system of claim 1, wherein the first and second simulators receive over the network physics data for some of the virtual objects in the simulation environment and each of the simulators determines positions therefor based on said physics data using respective physics engine components.

* * * * *

UNITED STATES PATENT AND TRADEMARK OFFICE
CERTIFICATE OF CORRECTION

PATENT NO. : 8,864,497 B1  
APPLICATION NO. : 12/955892  
DATED : October 21, 2014  
INVENTOR(S) : Eytan Pollak et al.

Page 1 of 1

It is certified that error appears in the above-identified patent and that said Letters Patent is hereby corrected as shown below:

On the title page item (73), add:

--University of Central Florida Research Foundation, Inc.
  Orlando, FL--

Signed and Sealed this
Third Day of November, 2015

Michelle K. Lee
*Director of the United States Patent and Trademark Office*